United States Patent
Matsuda et al.

(10) Patent No.: US 12,344,341 B2
(45) Date of Patent: Jul. 1, 2025

(54) STEERING CONTROL DEVICE AND STEERING CONTROL METHOD

(71) Applicants: JTEKT CORPORATION, Kariya (JP); TOYOTA JIDOSHA KABUSHIKI KAISHA, Toyota (JP)

(72) Inventors: Satoshi Matsuda, Okazaki (JP); Isao Namikawa, Okazaki (JP); Koji Anraku, Okazaki (JP); Tomoyuki Iida, Nisshin (JP); Kenji Shibata, Nagoya (JP)

(73) Assignees: JTEKT CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 104 days.

(21) Appl. No.: 18/383,696

(22) Filed: Oct. 25, 2023

(65) Prior Publication Data
US 2024/0149940 A1    May 9, 2024

(30) Foreign Application Priority Data
Nov. 9, 2022    (JP) ................................ 2022-179782

(51) Int. Cl.
| | |
|---|---|
| *B62D 5/00* | (2006.01) |
| *B62D 5/04* | (2006.01) |
| *B62D 6/00* | (2006.01) |

(52) U.S. Cl.
CPC ............. *B62D 6/008* (2013.01); *B62D 5/006* (2013.01); *B62D 5/0481* (2013.01)

(58) Field of Classification Search
CPC ...... B62D 6/008; B62D 5/006; B62D 5/0493; B62D 5/0481
See application file for complete search history.

(56) References Cited

U.S. PATENT DOCUMENTS

| | | |
|---|---|---|
| 6,213,248 B1 | 4/2001 | Kawaguchi et al. |
| 11,214,303 B2 | 1/2022 | Shibata et al. |

(Continued)

FOREIGN PATENT DOCUMENTS

| | | |
|---|---|---|
| EP | 3 647 159 A1 | 5/2020 |
| EP | 3 647 161 A1 | 5/2020 |

(Continued)

OTHER PUBLICATIONS

May 17, 2024 extended Search Report issued in European Patent Application No. 23207963.2.

*Primary Examiner* — Jacob M Amick
(74) *Attorney, Agent, or Firm* — Oliff PLC

(57) ABSTRACT

A steering control device includes a processor configured to execute a reaction force control process. The reaction force control process includes a reaction force torque calculation process of calculating a reaction force torque operation amount. The reaction force torque calculation process includes a deviation compensation calculation process of calculating a deviation-compensating component. The deviation compensation calculation process includes a process of calculating a positional deviation, a process of calculating the deviation-compensating component based on the positional deviation, and a process of switching among a plurality of calculation states for calculating the deviation-compensating component. The process of switching among the calculation states is a process of permitting switching among the calculation states on the condition that a permission condition is met. The permission condition is met based on an operation amount that varies in association with a driver's operation of an operation member.

6 Claims, 9 Drawing Sheets

(56) References Cited

U.S. PATENT DOCUMENTS

| | | | |
|---|---|---|---|
| 2004/0211618 A1 | 10/2004 | Ogawa et al. | |
| 2020/0307681 A1* | 10/2020 | Kakimoto | B62D 6/008 |
| 2021/0009198 A1 | 1/2021 | Suzuki | |
| 2022/0089217 A1 | 3/2022 | Namikawa et al. | |
| 2023/0034107 A1* | 2/2023 | Son | B62D 5/0481 |
| 2025/0074504 A1* | 3/2025 | Reitemann | B62D 6/001 |

FOREIGN PATENT DOCUMENTS

| | | |
|---|---|---|
| EP | 3 974 290 A1 | 3/2022 |
| JP | 2021-011230 A | 2/2021 |
| JP | 2022-053436 A | 4/2022 |

* cited by examiner

|  | $\Delta\theta \geq \Delta\theta th$ | $\Delta\theta < \Delta\theta th$ |
|---|---|---|
| $Th \geq Thth$ | SWITCHING IS PERMITTED ($\omega \geq \omega th$) | SWITCHING IS PERMITTED ($\omega \geq \omega th$) |
| $Th < Thth$ | SWITCHING IS DEFERRED | SWITCHING IS PERMITTED |

STEERING CONTROL DEVICE AND STEERING CONTROL METHOD

CROSS-REFERENCE TO RELATED APPLICATION

This application claims priority to Japanese Patent Application No. 2022-179782 filed on Nov. 9, 2022, incorporated herein by reference in its entirety.

BACKGROUND

1. Technical Field

The present disclosure relates to a steering control device and a steering control method.

2. Description of Related Art

For example, Japanese Unexamined Patent Application Publication No. 2022-053436 (JP 2022-053436 A) describes a steer-by-wire steering device that is installed in a vehicle. The steering device described in JP 2022-053436 A notifies a driver of a state of the steering device by applying, to a steering wheel, a reaction force torque that resists the driver's operation of the steering wheel. To do so, a steering control device that controls the steering device as a target controls the operation of a reaction force motor provided in an operation unit.

More specifically, the steering control device executes a process for making the reaction force motor generate a reaction force torque according to deviation that is mismatch between a rotation position of the steering wheel and a turning position of turning wheels. The steering control device executes a process of making the reaction force motor generate a higher reaction force torque as the deviation becomes larger. Further, when the deviation occurs due to the operation of a turning motor being restricted, the steering control device executes a process of making the reaction force motor generate a reaction force torque that is even higher than at normal times.

SUMMARY

In the case where the reaction force torque varies depending on whether the operation of the turning motor is restricted, the steering wheel may rotate under the influence of the reaction force torque when, for example, the driver's operation torque input into the steering wheel is low.

A steering control device according to a first aspect of the present disclosure is configured to control a steering device of a vehicle. The steering device has a structure in which a power transmission path between an operation unit and a turning unit is cut off. The operation unit includes an operation member and a reaction force motor configured to generate a reaction force torque that resists a driver's operation of the operation member. The turning unit is configured to turn a turning wheel and includes a turning motor configured to generate a turning torque for turning the turning wheel. The steering control device includes a processor configured to execute a reaction force control process for controlling operation of the reaction force motor so as to apply the reaction force torque to the operation member. The reaction force control process includes a reaction force torque calculation process of calculating a reaction force torque operation amount indicating the reaction force torque to be generated by the reaction force motor. The reaction force torque calculation process includes a deviation compensation calculation process of calculating a deviation-compensating component. The deviation-compensating component is a component that is reflected in the reaction force torque operation amount so as to compensate for discrepancy in a relationship between an operation position of the operation member and a turning position of the turning wheel. The deviation compensation calculation process includes: a process of calculating a positional deviation that quantitatively indicates a degree of discrepancy in the relationship between the operation position and the turning position; a process of calculating the deviation-compensating component based on the positional deviation; and a process of switching among a plurality of calculation states for calculating the deviation-compensating component. The plurality of calculation states includes a first calculation state that is set in a context where operation of the turning motor is not restricted and a second calculation state that is set in a context where the operation of the turning motor is restricted. The second calculation state is a calculation state in which the deviation-compensating component of a larger absolute value is calculated than in the first calculation state. The process of switching among the calculation states is a process of permitting switching among the calculation states on the condition that a permission condition is met. The permission condition is met based on an operation amount that varies in association with the driver's operation of the operation member.

A steering control method according to a second aspect of the present disclosure is a method of controlling a steering device of a vehicle having a structure in which a power transmission path between an operation unit and a turning unit is cut off. The operation unit includes an operation member and a reaction force motor configured to generate a reaction force torque that resists a driver's operation of the operation member. The turning unit includes a turning motor configured to generate a turning torque for turning a turning wheel. The steering control method includes executing, by a processor, a reaction force control process for controlling operation of the reaction force motor so as to apply the reaction force torque to the operation member. The reaction force control process includes a reaction force torque calculation process of calculating a reaction force torque operation amount indicating the reaction force torque to be generated by the reaction force motor. The reaction force torque calculation process includes a deviation compensation calculation process of calculating a deviation-compensating component. The deviation-compensating component is a component that is reflected in the reaction force torque operation amount so as to compensate for discrepancy in a relationship between an operation position of the operation member and a turning position of the turning wheel. The deviation compensation calculation process includes: a process of calculating a positional deviation that quantitatively indicates a degree of discrepancy in the relationship between the operation position and the turning position; a process of calculating the deviation-compensating component based on the positional deviation; and a process of switching among a plurality of calculation states for calculating the deviation-compensating component. The plurality of calculation states includes a first calculation state that is set in a context where operation of the turning motor is not restricted and a second calculation state that is set in a context where the operation of the turning motor is restricted. The second calculation state is a calculation state in which the deviation-compensating component of a larger absolute value is calculated than in the first calculation state. The process of switching among the calculation states is a process of permitting switching among the calculation states on a condition that a permission condition is met. The permission condition is met based on an operation amount that varies in association with the driver's operation of the operation member.

The steering control device and the steering control method according to the first aspect and the second aspect, respectively, of the present disclosure switch among the calculation states on the condition that the permission condition is met, which is met based on the operation amount that varies in association with the driver's operation of the operation member. The operation amount that varies in association with the driver's operation of the operation member allows inference of a state of the operation member in the case where a reaction force torque reflecting the deviation-compensating component is applied to the operation member. That is, the permission condition can be specified to have a content that is met when the operation member can be inferred to be in the state of being less likely to move under the influence of the reaction force torque reflecting the deviation-compensating component calculated in the calculation state having been switched. Thus, switching among the calculation states can be permitted when the operation member is inferred to be in the state of being less likely to move under the influence of the reaction force torque. As a result, discomfort caused to the driver can be mitigated.

In the steering control device according to the first aspect of the present disclosure, the operation amount may include an operation torque that is input into the operation member. The permission condition may include a condition based on a result of a comparison in magnitude between the operation torque and a torque threshold value. The process of switching among the calculation states may be a process of permitting switching among the calculation states on the condition that a torque permission condition is met. The torque permission condition is met when an absolute value of the operation torque is equal to or larger than the torque threshold value.

In the steering control device according to the first aspect of the present disclosure, the result of the comparison in magnitude between the operation torque and the torque threshold value allows appropriate inference of the magnitude of a force acting on the operation member other than the reaction force torque. This is effective in increasing the inference accuracy as to whether the operation member is in the state of being less likely to move under the influence of the reaction force torque.

In the steering control device according to the first aspect of the present disclosure, the operation amount may include the positional deviation. The permission condition may include a condition based on a result of a comparison in magnitude between the positional deviation and a positional deviation threshold value. The process of switching among the calculation states may be a process of permitting switching among the calculation states on the condition that at least either a positional deviation permission condition or the torque permission condition is met. The positional deviation permission condition may be met when an absolute value of the positional deviation is smaller than the positional deviation threshold value.

In the steering control device according to the first aspect of the present disclosure, the result of the comparison in magnitude between the positional deviation and the positional deviation threshold value allows appropriate inference of the magnitude of the deviation-compensating component to be reflected in the reaction force torque applied to the operation member. This is effective in increasing the inference accuracy as to whether the operation member is in the state of being less likely to move under the influence of the reaction force torque.

In the steering control device according to the first aspect of the present disclosure, the operation amount may include a deviation compensation-related component that is obtained in association with a calculation of the deviation-compensating component. The permission condition may include a condition based on a result of a comparison in magnitude between the deviation compensation-related component and a deviation compensation-related component threshold value. The process of switching among the calculation states may be a process of permitting switching among the calculation states on the condition that a deviation compensation-related component permission condition is met. The deviation compensation-related component permission condition may be met when an absolute value of the deviation compensation-related component is smaller than the deviation compensation-related component threshold value.

In the steering control device according to the first aspect of the present disclosure, the result of the comparison in magnitude between the deviation compensation-related component and the deviation compensation-related component threshold value allows appropriate inference of the magnitude of the reaction force torque to be applied to the operation member. This is effective in increasing the inference accuracy as to whether the operation member is in the state of being less likely to move under the influence of the reaction force torque.

In the steering control device according to the first aspect of the present disclosure, the operation amount may include an operation speed of the operation member. The permission condition may include a condition based on a result of a comparison in magnitude between the operation speed and an operation speed threshold value. The process of switching among the calculation states may be a process of permitting switching among the calculation states on the condition at least that an operation speed permission condition is met. The operation speed permission condition may be met when an absolute value of the operation speed is smaller than the operation speed threshold value.

In the steering control device according to the first aspect of the present disclosure, the result of the comparison in magnitude between the operation speed and the operation speed threshold value allows appropriate inference as to whether the operation member is moving. That is, the permission condition can be specified to have a content that is met when the operation member is inferred to be moving. This is effective in mitigating discomfort caused to the driver.

The steering control device and the steering control method according to the first aspect and the second aspect, respectively, of the present disclosure can mitigate discomfort caused to the driver.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

First Embodiment

Figure 1:
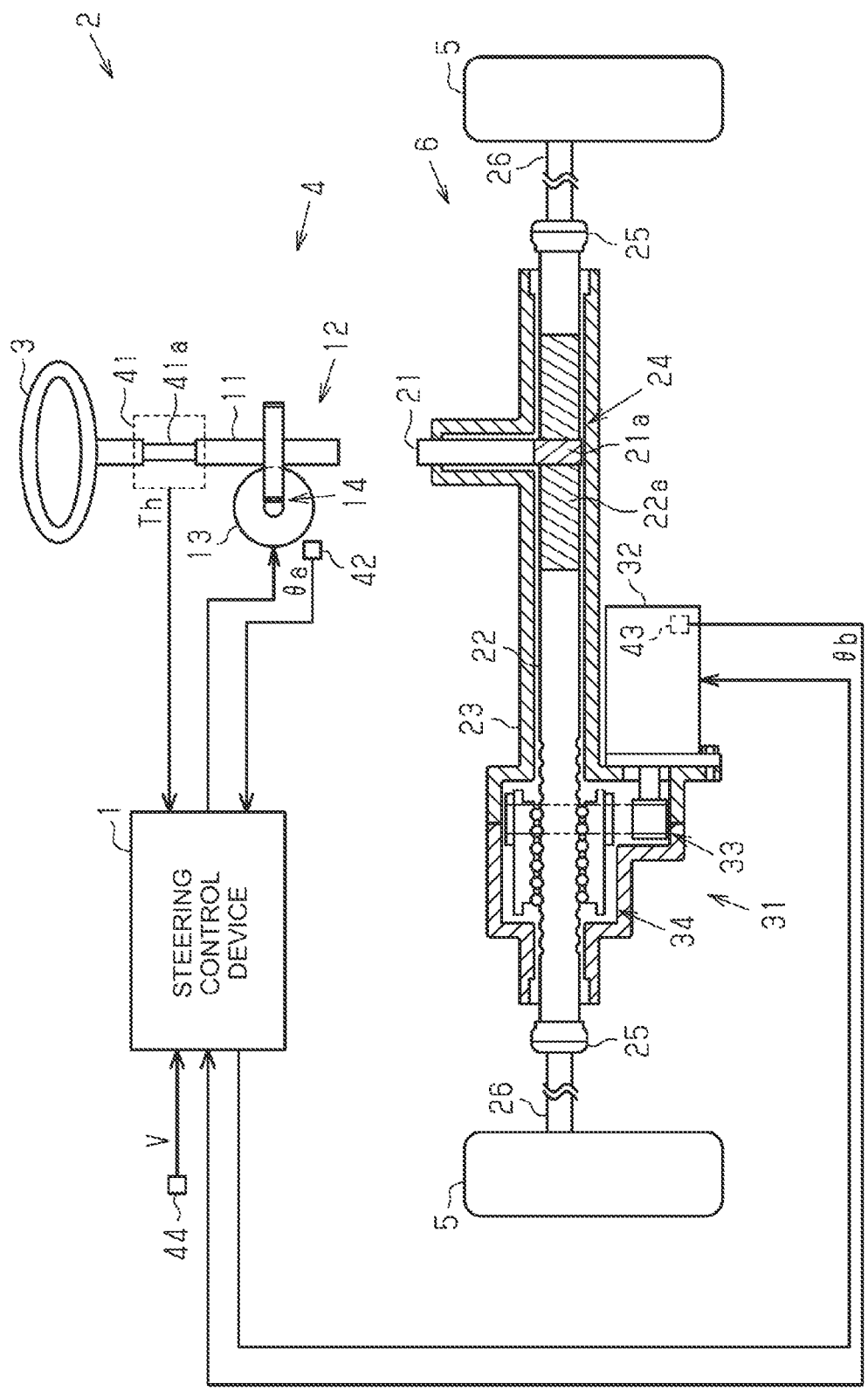
FIG. 1 is a diagram showing the configuration of a steer-by-wire steering device according to a first embodiment.

A steering control device according to a first embodiment will be described. As shown in FIG. 1, a steering device 2 is a steer-by-wire vehicle steering device. The steering device 2 includes a steering control device 1, an operation unit 4, and a turning unit 6. The operation unit 4 is a mechanical part that is operated by a driver when changing the advancing direction of the vehicle. The turning unit 6 is a mechanical part that turns left and right turning wheels 5 of the vehicle. The steering device 2 has a structure in which a power transmission path between the operation unit 4 and the turning unit 6 is always mechanically cut off. The steering control device 1 controls the operation of the turning unit 6 according to the operation state of the operation unit 4. Thus, the steering control device 1 controls the steering device 2 as a target.

The operation unit 4 has a steering shaft 11 and a reaction force actuator 12. The steering shaft 11 is coupled to a steering wheel 3. The steering wheel 3 is an operation member that is operated by the driver. The reaction force actuator 12 has a reaction force motor 13 and a speed reduction mechanism 14. The reaction force motor 13 is a generation source of a reaction force torque to be applied to the steering wheel 3. The reaction force torque is a force that resists steering operation that is the driver's operation of the steering wheel 3. The reaction force motor 13 is, for example, a three-phase brushless motor. The speed reduction mechanism 14 is, for example, a worm speed reduction mechanism formed by a worm-and-wheel. The speed reduction mechanism 14 transmits rotation of the reaction force motor 13 to the steering shaft 11. The rotation transmitted to the steering shaft 11 through the speed reduction mechanism 14 is applied to the steering wheel 3 as a reaction force torque.

The turning unit 6 has a pinion shaft 21, a rack shaft 22, and a housing 23. The housing 23 rotatably supports the pinion shaft 21. The housing 23 reciprocably houses the rack shaft 22. The pinion shaft 21 is provided so as to intersect with the rack shaft 22. Pinion teeth 21a of the pinion shaft 21 and rack teeth 22a of the rack shaft 22 mesh with each other to form a rack-and-pinion mechanism 24. Both ends of the rack shaft 22 protrude from both ends of the housing 23 in an axial direction. Tie rods 26 are coupled to both ends of the rack shaft 22 through rack ends 25 formed by ball joints. Leading ends of the tie rods 26 are coupled to knuckles (not shown) on which the left and right turning wheels 5 are mounted.

The turning unit 6 includes a turning actuator 31. The turning actuator 31 includes a turning motor 32, a transmission mechanism 33, and a conversion mechanism 34. The turning motor 32 is a generation source of a turning torque to be applied to the rack shaft 22. The turning torque is a force for turning the turning wheels 5. The turning motor 32 is, for example, a three-phase brushless motor. The transmission mechanism 33 is, for example, a belt transmission mechanism. The transmission mechanism 33 transmits rotation of the turning motor 32 to the conversion mechanism 34. The conversion mechanism 34 is, for example, a ball screw mechanism. The conversion mechanism 34 converts the rotation transmitted thereto through the transmission mechanism 33 into motion of the rack shaft 22 in an axial direction.

As the rack shaft 22 moves in the axial direction, a turning angle of the turning wheels 5 is changed. Meanwhile, a reaction force torque is applied to the steering wheel 3. This reaction force torque changes an operation torque Th that is the driver's force required for steering operation.

The reason for providing the pinion shaft 21 is to support the rack shaft 22 along with the pinion shaft 21 inside the rack housing 23. By a support mechanism (not shown) provided in the steering device 2, the rack shaft 22 is supported so as to be movable along its axial direction and is pressed toward the pinion shaft 21. Thus, the rack shaft 22 is supported inside the rack housing 23. However, another support mechanism may be provided that supports the rack shaft 22 on the rack housing 23 without using the pinion shaft 21.

Electrical Configuration of Steering Device

As shown in FIG. 1, the steering control device 1 is connected to the reaction force motor 13 and the turning motor 32. The steering control device 1 refers to detection results of sensors installed in the vehicle. The sensors include a torque sensor 41, two rotation angle sensors 42, 43, and a vehicle speed sensor 44. The steering control device 1 refers to the operation torque Th detected by the torque sensor 41. The torque sensor 41 is provided, for example, at a portion of the steering shaft 11 between the steering wheel 3 and the speed reduction mechanism 14. The operation torque Th is the driver's torque that is input during steering operation, and is an operation amount that varies in association with the steering operation. The operation torque Th is detected in association with twisting of a torsion bar 41*a* that is provided at between the steering wheel 3 and the speed reduction mechanism 14 in the steering shaft 11. The steering control device 1 refers to a rotation angle θa detected by the rotation angle sensor 42. The rotation angle sensor 42 is provided, for example, on the reaction force motor 13. The rotation angle θa is an angle of a rotating shaft of the reaction force motor 13 within a range of 360 degrees. The steering control device 1 refers to a rotation angle θb detected by the rotation angle sensor 43. The rotation angle sensor 43 is provided, for example, on the turning motor 32. The rotation angle θb is an angle of a rotating shaft of the turning motor 32 within a range of 360 degrees. The steering control device 1 refers to a vehicle speed V detected by the vehicle speed sensor 44. The vehicle speed V is a traveling speed of the vehicle. The steering control device 1 controls the operation of the motors 13, 32 with reference to the operation state of the operation unit 4, the turning state of the turning unit 6, and the detection results of various sensors. The steering control device 1 controls power supply to the motors 13, 32.

Electrical Configuration of Steering Control Device

Figure 2:
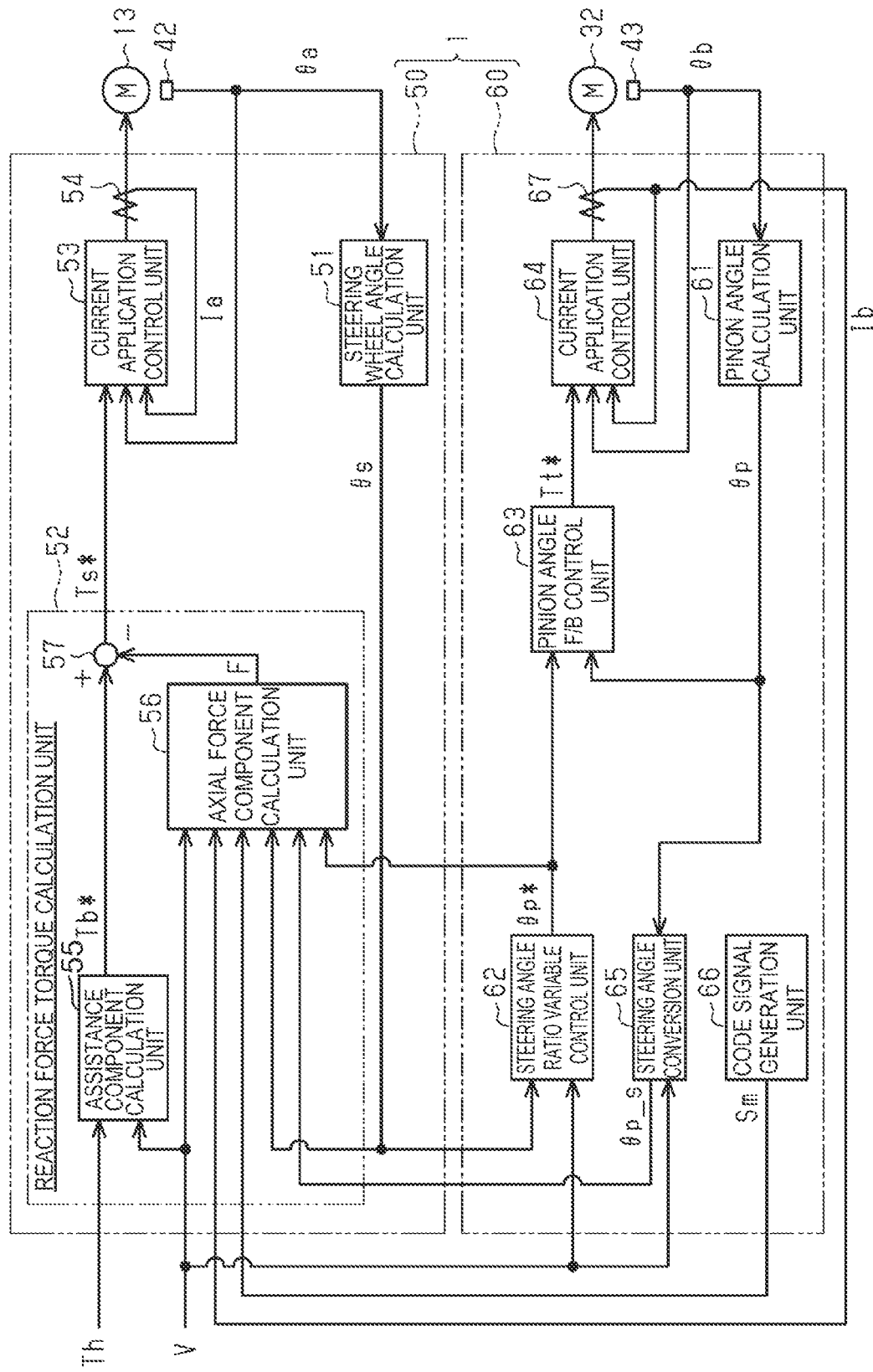
FIG. 2 is a block diagram showing processes executed by a steering control device of FIG. 1.

As shown in FIG. 2, the steering control device 1 has a reaction force control unit 50 and a turning control unit 60. The reaction force control unit 50 executes a reaction force control process for controlling the operation of the reaction force motor 13. That is, the reaction force control unit 50 controls power supply to the reaction force motor 13. The turning control unit 60 executes a turning control process for controlling the operation of the turning motor 32. That is, the turning control unit 60 controls power supply to the turning motor 32. The reaction force control unit 50 and the turning control unit 60 transmit and receive information to and from each other through a local network, such as serial communication. The reaction force control unit 50 constitutes a part of the operation unit 4. The turning control unit 60 constitutes a part of the turning unit 6.

The reaction force control unit 50 includes a central processing unit (CPU) and a memory (neither of which is shown). In the reaction force control unit 50, the CPU executes a program stored in the memory on a predetermined arithmetic operation cycle. The CPU and the memory constitute a microcomputer that is a processing circuit. Similarly, the turning control unit 60 includes a central processing unit (CPU) and a memory (neither of which is shown). In the turning control unit 60, the CPU executes a program stored in the memory on a predetermined arithmetic operation cycle. The CPU and the memory constitute a microcomputer that is a processing circuit. The memory includes a computer-readable medium, such as a random-access memory (RAM) and a read-only memory (ROM). However, that various processes are realized by software is one example. The processing circuit that the reaction force control unit 50 has may be configured such that at least some of the processes are realized by a hardware circuit, such as a logic circuit. The same applies to the turning control unit 60.

Reaction Force Control Unit

The reaction force control unit 50 has a steering wheel angle calculation unit 51, a reaction force torque calculation unit 52, and a current application control unit 53.

The steering wheel angle calculation unit 51 is a process of calculating a steering wheel angle θs using the rotation angle θa as an input. More specifically, the steering wheel angle calculation unit 51 includes a process of, for example, counting the number of rotations of the reaction force motor 13 from a steering wheel neutral position and converting the number of rotations into an integrated angle including a range exceeding 360°. The steering wheel neutral position is a rotation position, i.e., an operation position of the steering wheel 3 when the vehicle is traveling straight ahead. The steering wheel angle calculation unit 51 calculates the steering wheel angle θs by multiplying the integrated angle, obtained by the conversion, by a conversion factor based on a rotation speed ratio of the speed reduction mechanism 14. For example, the steering wheel angle θs is defined as positive when it is an angle on the right side of the steering wheel neutral position and as negative when it is an angle on the left side thereof.

The reaction force torque calculation unit 52 is a reaction force torque calculation process for calculating a reaction force torque operation amount Ts* using the operation torque Th, the vehicle speed V, the steering wheel angle θs, and a plurality of pieces of turning-derived information as inputs. The reaction force torque operation amount Ts* is an operation amount serving as a target of the reaction force torque to be generated by the reaction force motor 13. The plurality of pieces of turning-derived information are pieces of information obtained from the turning control unit 60 and include, for example, an actual current Ib, a target pinion angle θp*, a turning-converted angle θp_s, and a code signal Sm.

The current application control unit 53 is a process for supplying electricity according to the reaction force torque operation amount Ts* to the reaction force motor 13. More specifically, the current application control unit 53 includes a process of calculating a current command value that is an operation signal for the reaction force motor 13 using the reaction force torque operation amount Ts*, the rotation angle θa, and the actual current Ia as inputs. The current application control unit 53 includes a process of detecting the value of an actual current Ia occurring in a power supply path to the reaction force motor 13 through a current sensor 54 provided in the power supply path. The value of the actual current Ia is a value of a current supplied to the reaction force motor 13. The current application control unit 53 includes a process of obtaining deviation between the current command value and the value of the actual current Ia and controlling power supply to the reaction force motor 13 so as to eliminate this deviation. As a result, the reaction force motor 13 generates a torque according to the reaction force torque operation amount Ts*. Thus, an appropriate feeling of resistance can be given to the driver.

Turning Control Unit

The turning control unit 60 has a pinion angle calculation unit 61, a steering angle ratio variable control unit 62, a pinion angle feedback control unit ("PINION ANGLE F/B CONTROL UNIT" in FIG. 2) 63, a current application control unit 64, a steering angle conversion unit 65, and a code signal generation unit 66.

The pinion angle calculation unit 61 is a process of calculating a pinion angle θp using the rotation angle θb as an input. More specifically, the pinion angle calculation unit 61 includes a process of, for example, counting the number of rotations of the turning motor 32 from a rack neutral position and converting the number of rotations into an integrated angle including a range exceeding 360°. The rack neutral position is an axial position of the rack shaft 22 when the vehicle is traveling straight ahead. The pinion angle calculation unit 61 includes a process of calculating the pinion angle θp by multiplying the integrated angle, obtained by the conversion, by a conversion factor. The pinion angle θp is an actual rotation angle of the pinion shaft 21. The conversion factor is a value obtained based on a speed reduction ratio of the transmission mechanism 33, a lead of the conversion mechanism 34, and a rotation speed ratio of the rack-and-pinion mechanism 24. For example, the pinion angle $\theta p$ is defined as positive when it is an angle on the right side of the rack neutral position and as negative when it is an angle on the left side thereof. The turning motor 32 and the pinion shaft 21 operate in conjunction with each other through the transmission mechanism 33, the conversion mechanism 34, and the rack shaft 22. Therefore, there is a correlation between the rotation angle $\theta b$ of the turning motor 32 and the pinion angle $\theta p$. Using this correlation, the pinion angle $\theta p$ can be obtained from the rotation angle $\theta b$ of the turning motor 32. The pinion shaft 21 meshes with the rack shaft 22. Therefore, there is also a correlation between the pinion angle $\theta p$ and the amount of movement of the rack shaft 22. Thus, the pinion angle $\theta p$ is a value reflecting the turning angle, i.e., the turning position of the turning wheels 5.

The steering angle ratio variable control unit 62 is a process of calculating a target pinion angle $\theta p^*$ using the steering wheel angle $\theta s$ and the vehicle speed V as inputs. More specifically, the steering angle ratio variable control unit 62 includes a process of calculating the target pinion angle $\theta p^*$ by adding an adjustment amount to the steering wheel angle $\theta s$. The adjustment amount is an operation amount for changing the steering angle ratio of the target pinion angle $\theta p^*$ relative to the steering wheel angle $\theta s$. The adjustment amount varies according to the vehicle speed V such that, for example, a change in the target pinion angle $\theta p^*$ relative to a change in the steering wheel angle $\theta s$ becomes larger when the vehicle speed V is low than when it is high. Therefore, there is a correlation between the steering wheel angle $\theta s$ and the target pinion angle $\theta p^*$. The pinion angle $\theta p$ is controlled based on the target pinion angle $\theta p^*$. Therefore, there is also a correlation between the steering wheel angle $\theta s$ and the pinion angle $\theta p$. Thus, the pinion angle $\theta p$ is a value reflecting the steering wheel angle $\theta s$.

The pinion angle feedback control unit 63 is a process of calculating a turning torque operation amount $Tt^*$ using the target pinion angle $\theta p^*$ and the pinion angle $\theta p$ as inputs. More specifically, the pinion angle feedback control unit 63 includes a process of executing PD control using a proportional term and a differential term as feedback control of the pinion angle $\theta p$ so as to adapt the pinion angle $\theta p$ to the target pinion angle $\theta p^*$. The pinion angle feedback control unit 63 includes a process of obtaining a deviation between the target pinion angle $\theta p^*$ and the pinion angle $\theta p$ and calculating the turning torque operation amount $Tt^*$ so as to eliminate this deviation. The turning torque operation amount $Tt^*$ is an operation amount serving as a target of the turning torque to be generated by the turning motor 32.

The current application control unit 64 is a process for supplying electricity according to the turning torque operation amount $Tt^*$ to the turning motor 32. More specifically, the current application control unit 64 includes a process of calculating a current command value that is an operation signal for the turning motor 32 using the turning torque operation amount $Tt^*$, the rotation angle $\theta b$, and the actual current Ib as inputs. The current application control unit 64 includes a process of detecting the value of the actual current Ib occurring in a power supply path to the turning motor 32 through a current sensor 67 provided in the power supply path. The value of the actual current Ib is the value of a current supplied to the turning motor 32. The current application control unit 64 includes a process of obtaining a deviation between the current command value and the value of the actual current Ib and controlling power supply to the turning motor 32 so as to eliminate this deviation. As a result, the turning motor 32 generates a torque according to the turning torque operation amount $Tt^*$. Thus, the turning wheels 5 turn by an angle according to the turning torque operation amount $Tt^*$.

The steering angle conversion unit 65 is a process for calculating the turning-converted angle $\theta p\_s$ using the pinion angle $\theta p$ and the vehicle speed V as inputs. More specifically, the steering angle conversion unit 65 includes a process of calculating the turning-converted angle $\theta p\_s$ by adding an inverse adjustment value to the pinion angle $\theta p$. The inverse adjustment amount is an operation amount obtained by an arithmetic operation rule in which the input-output relationship is reversed relative to an arithmetic operation rule defined by the steering angle ratio variable control unit 62. The inverse adjustment amount varies according to the vehicle speed V such that, for example, a change in the turning-converted angle $\theta p\_s$ relative to a change in the pinion angle $\theta p$ becomes smaller when the vehicle speed V is low than when it is high. Thus, while the pinion angle $\theta p$ is represented as a value of an index of the turning angle of the turning wheels 5, the turning-converted angle $\theta p\_s$ is represented as a value of an index of the steering wheel angle $\theta s$.

The code signal generation unit 66 is a process for determining a heating state as a state of the turning motor 32 with reference to detection results of a temperature sensor etc. (not shown). More specifically, the code signal generation unit 66 includes a process of determining the heating state as a state of the turning motor 32 through a comparison between a temperature detected by the temperature sensor and a plurality of temperature threshold values. The temperature sensor detects, for example, the temperature of a motor coil or an inverter of the turning motor 32. The heating state of the turning motor 32 includes, for example, a normal heating state, a slight overheating state, a moderate overheating state, and a serious overheating state in ascending order of the necessity to restrict the operation of the turning motor 32. The normal heating state indicates that the operation of the turning motor 32 is not to be restricted. On the other hand, the slight overheating state, the moderate overheating state, and the serious overheating state indicate that the operation of the turning motor 32 is to be restricted.

Further, the code signal generation unit 66 is a process for determining a voltage state of a direct-current power source with reference to detection results of a voltage sensor etc. (not shown). More specifically, the code signal generation unit 66 includes a process of determining the state of the voltage of the direct-current power source through a comparison between a voltage detected by the voltage sensor and a plurality of voltage threshold values. For example, the voltage sensor detects the voltage of a direct-current power source, such as a battery. The voltage state of the direct-current power source includes, for example, a normal voltage state, a slight low-voltage state, a moderate low-voltage state, and a serious low-voltage state in ascending order of the necessity to restrict the operation of the turning motor 32. The normal voltage state indicates that the operation of the turning motor 32 is not to be restricted. On the other hand, the slight low-voltage state, the moderate low-voltage state, and the serious low-voltage state indicate that the operation of the turning motor 32 is to be restricted.

Further, the code signal generation unit 66 includes a process for generating the code signal Sm with reference to the heating state of the turning motor 32 and the voltage state of the direct-current power source. In the code signal generation unit 66, the turning control unit 60 encodes the state of the steering device 2 in accordance with a code table stored in a storage unit of the turning control unit 60. Encoding refers to a process of representing the state of the steering device 2 by a code as a symbol. The state of the steering device 2 includes the heating state of the turning motor 32 and the voltage state of the direct-current power source. One example of the correspondence relationship between the state of the steering device 2 and the code is as follows.

Code "0": The normal state in which the operation of the turning motor 32 is not restricted
Code "1A": The slight overheating state of the turning motor 32
Code "1B": The moderate overheating state of the turning motor 32
Code "1C": The serious overheating state of the turning motor 32
Code "2A": The slight low-voltage state of the direct-current power source
Code "2B": The moderate low-voltage state of the direct-current power source
Code "2C": The serious low-voltage state of the direct-current power source In the code signal generation unit 66, the turning control unit 60 generates the code signal Sm indicating a code corresponding to the state of the steering device 2.

The temperature threshold value is, for example, a value within a range in which the motor coil or the inverter is considered to be approaching an overheating state. The voltage threshold value is, for example, a value within a range in which the direct-current power source is considered to be approaching a state of being unable to sufficiently supply electricity.

In a state other than the normal heating state and the normal voltage state, the turning control unit 60 executes a process for restricting the operation of the turning motor 32. More specifically, the turning control unit 60 includes a process of, when restricting the operation of the turning motor 32, setting a protection mode in which the power supply to the turning motor 32 is restricted. On the other hand, the turning control unit 60 includes a process of, when not restricting the operation of the turning motor 32, setting a normal mode in which the power supply to the turning motor 32 is not restricted.

Reaction Force Torque Calculation Unit

As shown in FIG. 2, the reaction force torque calculation unit 52 has an assistance component calculation unit 55, an axial force component calculation unit 56, and a subtractor 57.

The assistance component calculation unit 55 is a process for calculating an assistance component Tb* using the operation torque Th and the vehicle speed V as inputs. More specifically, the assistance component calculation unit 55 includes a process of calculating the assistance component Tb* of a larger absolute value as the absolute value of the operation torque Th becomes larger or the vehicle speed V becomes lower. The assistance component Tb* is a component in the same direction as the direction of steering operation. The assistance component Tb* is calculated as a value of a torque dimension (N-m).

The axial force component calculation unit 56 is a process for calculating an axial force component F using the steering wheel angle θs, the vehicle speed V, the actual current Ib, the target pinion angle θp*, the turning-converted angle θp_s, and the code signal Sm as inputs. The axial force component F is an axial force acting on the rack shaft 22 through the turning wheels 5, and is a component in the opposite direction from the direction of steering operation.

Figure 3:
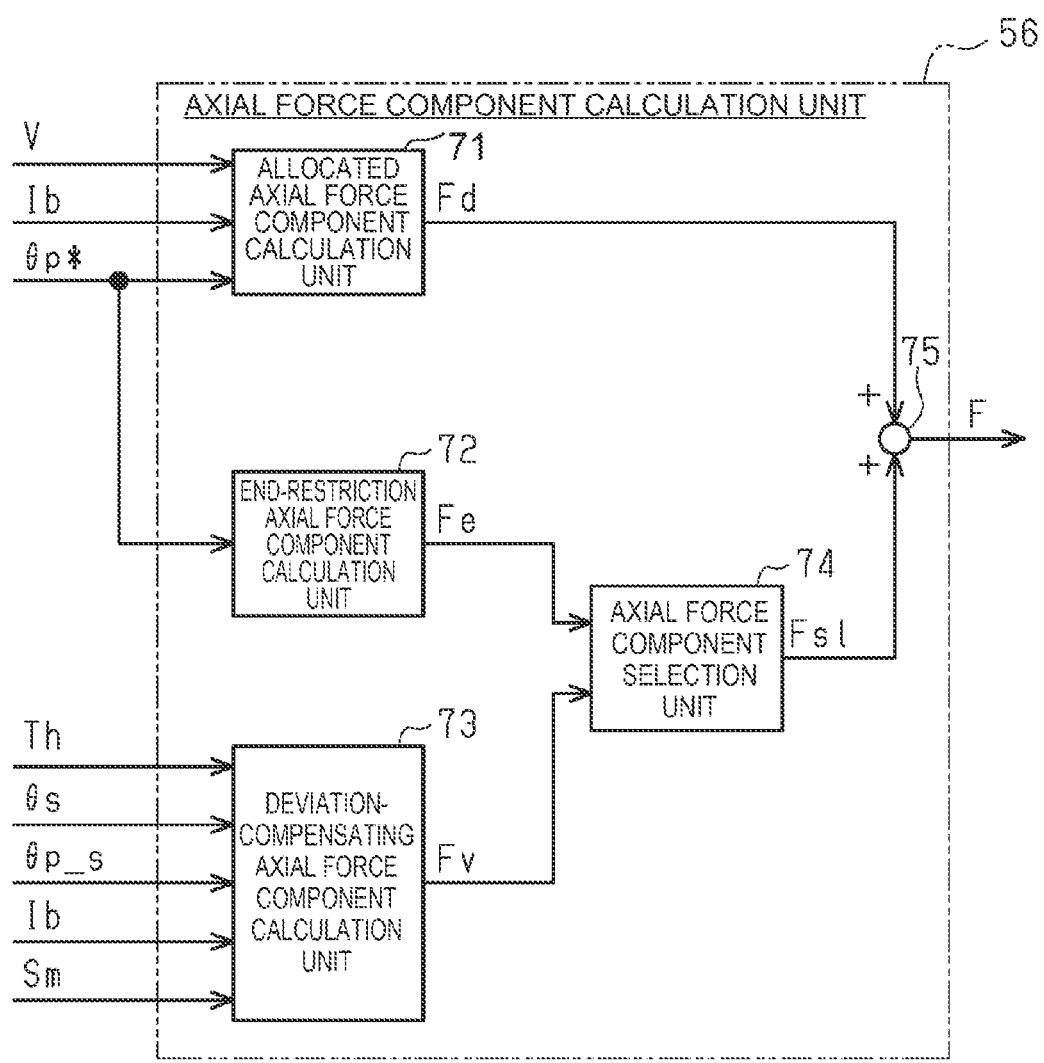
FIG. 3 is a block diagram showing processes executed by an axial force component calculation unit of FIG. 2.

More specifically, as shown in FIG. 3, the axial force component calculation unit 56 has an allocated axial force component calculation unit 71, an end-restriction axial force component calculation unit 72, a deviation-compensating axial force component calculation unit 73, an axial force component selection unit 74, and an adder 75.

The allocated axial force component calculation unit 71 is a process for calculating an allocated axial force component Fd using the vehicle speed V, the target pinion angle θp*, and the actual current Ib as inputs. More specifically, the allocated axial force component calculation unit 71 includes a process of calculating an angular axial force component using the vehicle speed V and the target pinion angle θp* as inputs. The angular axial force component is an ideal value of the axial force acting on the rack shaft 22 that is specified by an arbitrarily set vehicle model. The angular axial force component is an axial force that does not reflect road surface information. The allocated axial force component calculation unit 71 includes a process of calculating a current axial force component using the actual current Ib as an input. The current axial force component is an estimated value of the axial force that actually acts on the rack shaft 22 as the turning wheels 5 turn. The current axial force component is an axial force that reflects the road surface information. The allocated axial force component calculation unit 71 includes a process of calculating an allocation ratio using the vehicle speed V as an input. The allocation ratio is a proportion of allocation between the angular axial force component and the current axial force component. The allocated axial force component calculation unit 71 includes a process of calculating the allocated axial force component Fd by allocating the angular axial force component and the current axial force component at the allocation ratio.

The end-restriction axial force component calculation unit 72 is a process for calculating an end-restriction axial force component Fe using the target pinion angle θp* as an input. More specifically, the end-restriction axial force component calculation unit 72 includes a process of determining whether the situation is such that a turning limit of the turning wheels 5 is reached based on the target pinion angle θp*. The turning limit of the turning wheels 5 corresponds to an operation limit of the steering wheel 3. The end-restriction axial force component calculation unit 72 includes a process of calculating the end-restriction axial force component Fe when determining whether the situation is such that the turning limit of the turning wheels 5 is reached. The end-restriction axial force component Fe restricts further steering operation toward the side of exceeding the turning limit of the turning wheels 5. Such a situation at the turning limit is notified to the driver through the end-restriction axial force component Fe.

The deviation-compensating axial force component calculation unit 73 is a deviation compensation calculation process for calculating a deviation-compensating axial force component Fv using the operation torque Th, the steering wheel angle θs, the turning-converted angle θp_s, the actual current Ib, and the code signal Sm as inputs. The deviation-compensating axial force component Fv compensates for discrepancy in the relationship between the steering wheel angle θs of the operation unit 4 and the pinion angle θp of the turning wheels 5. Such a situation of discrepancy is notified to the driver through the deviation-compensating axial force component Fv. One example of the situation where discrepancy arises in the relationship between the steering wheel angle θs of the operation unit 4 and the pinion angle θp of the turning wheels 5 is a situation where the turning wheels 5 hit an obstacle, such as a curb. Another example is a situation where the operation of the turning motor 32 is restricted based on the heating state or the voltage state. In this embodiment, the deviation-compensating axial force component Fv is one example of the deviation-compensating component.

The axial force component selection unit 74 is a process for calculating a selected axial force component Fsl using the end-restriction axial force component Fe and the deviation-compensating axial force component Fv as inputs. More specifically, the axial force component selection unit 74 includes a process of selecting one of the end-restriction axial force component Fe and the deviation-compensating axial force component Fv that has the largest absolute value as the selected axial force component Fsl.

The adder 75 is a process for calculating the axial force component F by adding up the allocated axial force component Fd and the selected axial force component Fsl.

Deviation-Compensating Axial Force Component Calculation Unit

Figure 4:
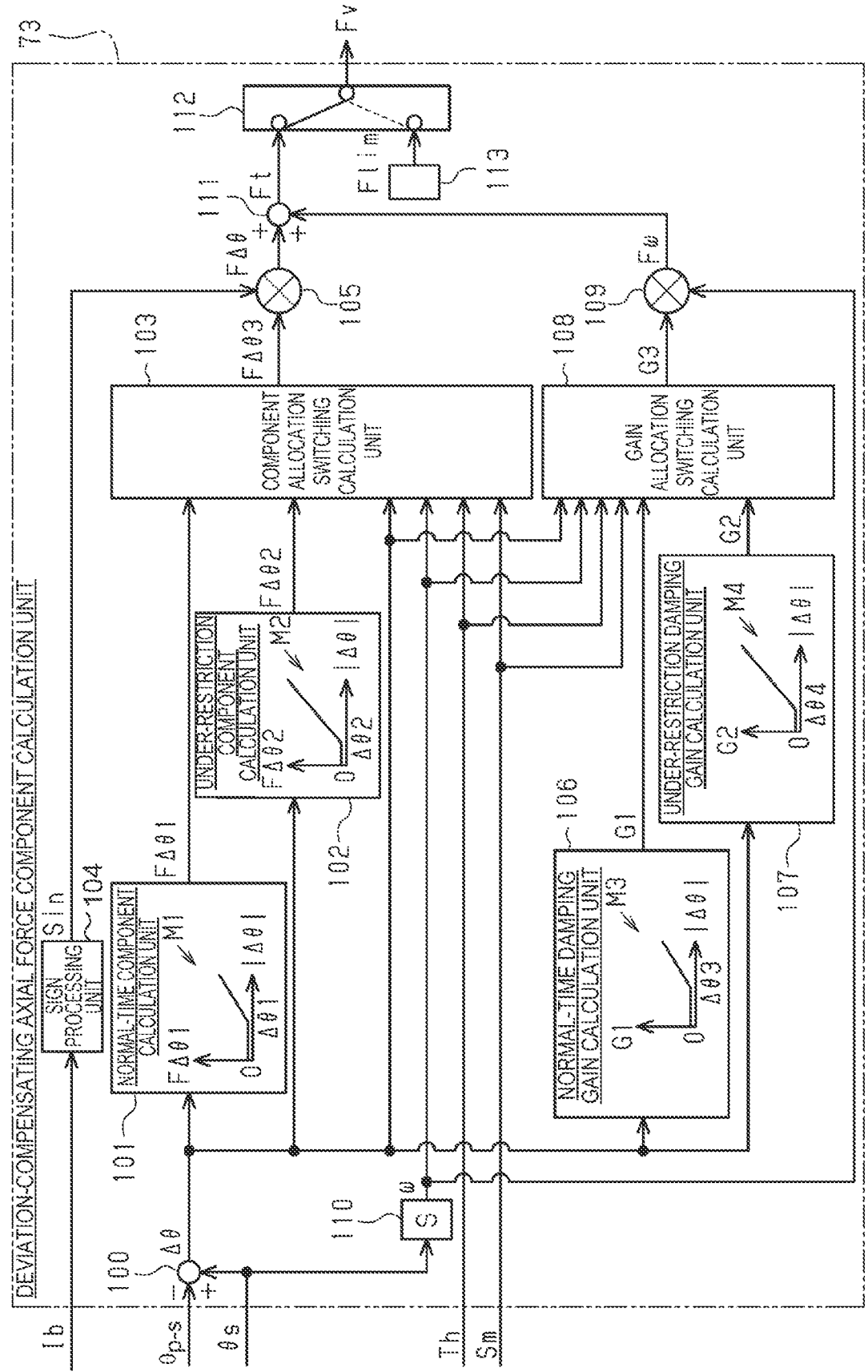
FIG. 4 is a block diagram showing processes executed by a deviation-compensating axial force component calculation unit of FIG. 3.

As shown in FIG. 4, the deviation-compensating axial force component calculation unit 73 has a subtractor 100, a normal-time component calculation unit 101, an under-restriction component calculation unit 102, a component allocation switching calculation unit 103, a sign processing unit 104, and a multiplier 105. Further, the deviation-compensating axial force component calculation unit 73 has a normal-time damping gain calculation unit 106, an under-restriction damping gain calculation unit 107, a gain allocation switching calculation unit 108, and a multiplier 109. In addition, the deviation-compensating axial force component calculation unit 73 has a differentiator 110, an adder 111, a guard processing unit 112, and a storage unit 113.

The subtractor 100 is a process for calculating a positional deviation $\Delta\theta$ using the steering wheel angle θs and the turning-converted angle θp_s as inputs. The positional deviation $\Delta\theta$ is an operation amount that quantitatively indicates the degree of discrepancy in the relationship between the steering wheel angle θs of the operation unit 4 and the pinion angle θp of the turning wheels 5, and is an operation amount that varies in association with the steering operation.

The normal-time component calculation unit 101 is a process for calculating a normal-time component F$\Delta\theta$1 using the positional deviation $\Delta\theta$ as an input. More specifically, the normal-time component calculation unit 101 includes a process in which the CPU calculates the normal-time component F$\Delta\theta$1 through map calculation using, for example, a normal-time component map M1. The normal-time component map M1 is map data that is stored in the memory of the reaction force control unit 50 in advance. The normal-time component map M1 is data in which the absolute value of the positional deviation $\Delta\theta$ is an input variable and the normal-time component F$\Delta\theta$1 is an output variable.

The map data is data set of discrete values of the input variable and values of the output variable corresponding to the respective values of the input variable. The map calculation may be a process in which, when the value of the input variable matches one of the values of the input variable in the map data, the corresponding value of the output variable in the map data is used as the calculation result. Further, the map calculation may be a process in which, when the value of the input variable matches none of the values of the input variable in the map data, a value obtained by interpolating the plurality of values of the output variable included in the map data is used as the calculation result. Or, instead of this, the map calculation may be a process in which, when the value of the input variable matches none of the values of the input variable in the map data, a value of the output variable in the map data corresponding to the closest value among the plurality of values of the output variable included in the map data is used as the calculation result.

As shown in FIG. 4, the normal-time component map M1 used by the normal-time component calculation unit 101 has the following characteristics. For example, when the absolute value of the positional deviation $\Delta\theta$ is equal to or smaller than a first threshold value $\Delta\theta$1, the value of the normal-time component F$\Delta\theta$1 is the value "0" that is a constant value. A range of the absolute value of the positional deviation $\Delta\theta$ equal to or smaller than the first threshold value $\Delta\theta$1 is a dead band in which the value of the normal-time component F$\Delta\theta$1 does not change even when the positional deviation $\Delta\theta$ changes. When the absolute value of the positional deviation $\Delta\theta$ is larger than the first threshold value $\Delta\theta$1, the value of the normal-time component F$\Delta\theta$1 is, for example, a value that increases monotonously according to the absolute value of the positional deviation $\Delta\theta$. This is because when the absolute value of the positional deviation $\Delta\theta$ is larger, the discrepancy in the relationship between the steering wheel angle θs of the operation unit 4 and the pinion angle θp of the turning wheels 5 is considered to be greater.

The under-restriction component calculation unit 102 is a process for calculating an under-restriction component F$\Delta\theta$2 using the positional deviation $\Delta\theta$ as an input. More specifically, the under-restriction component calculation unit 102 includes a process in which the CPU calculates the under-restriction component F$\Delta\theta$2 through map calculation using, for example, an under-restriction component map M2. The under-restriction component map M2 is map data that is stored in the memory of the reaction force control unit 50 in advance. The under-restriction component map M2 is data in which the absolute value of the positional deviation $\Delta\theta$ is an input variable and the under-restriction component F$\Delta\theta$2 is an output variable.

As shown in FIG. 4, the under-restriction component map M2 used by the under-restriction component calculation unit 102 has the following characteristics. For example, when the absolute value of the positional deviation $\Delta\theta$ is equal to or smaller than a second threshold value $\Delta\theta$2, the value of the under-restriction component F$\Delta\theta$2 is the value "0" that is a constant value. A range of the absolute value of the positional deviation $\Delta\theta$ equal to or smaller than the second threshold value $\Delta\theta$2 is a dead band in which the value of the under-restriction component F$\Delta\theta$2 does not change even when the positional deviation $\Delta\theta$ changes. The second threshold value $\Delta\theta$2 is a value smaller than the first threshold value $\Delta\theta$1. Therefore, the range of the dead band in the under-restriction component map M2 is narrower than that in the normal-time component map M1. When the absolute value of the positional deviation $\Delta\theta$ is larger than the second threshold value $\Delta\theta$2, the value of the under-restriction component F$\Delta\theta$2 is, for example, a value that increases monotonously according to the absolute value of the positional deviation $\Delta\theta$. The gradient of this monotonous increase is a steeper gradient than the gradient of the monotonous increase of the normal-time component F$\Delta\theta$1. Accordingly, when the positional deviation $\Delta\theta$ is the same, the value of the under-restriction component F$\Delta\theta$2 is a larger value than the normal-time component F$\Delta\theta$1.

The component allocation switching calculation unit 103 is a process for calculating an allocated component F$\Delta\theta$3 using the code signal Sm, the operation torque Th, a steering wheel angular speed ω, the positional deviation Δθ, the normal-time component FΔθ1, and the under-restriction component FΔθ2 as inputs. The component allocation switching calculation unit 103 includes a process of calculating the allocated component FΔθ3 by allocating the normal-time component FΔθ1 and the under-restriction component FΔθ2 at a predetermined proportion of allocation.

Figure 5:
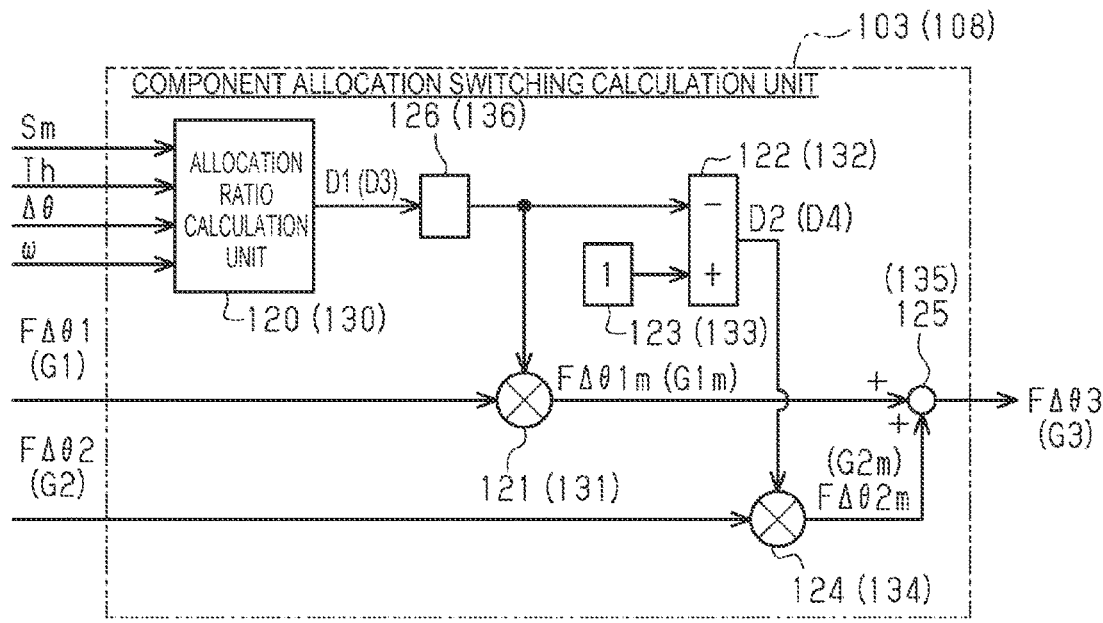
FIG. 5 is a block diagram showing processes executed by a component allocation switching calculation unit of FIG. 4.

More specifically, as shown in FIG. 5, the component allocation switching calculation unit 103 has an allocation ratio calculation unit 120, a multiplier 121, a subtractor 122, a storage unit 123, a multiplier 124, an adder 125, and a gradual change processing unit 126.

The allocation ratio calculation unit 120 is a process for calculating an allocation ratio D1 using the code signal Sm, the operation torque Th, the positional deviation Δθ, and the steering wheel angular speed ω as inputs. The steering wheel angular speed ω is a differentiated value obtained by differentiating the steering wheel angle θs in the differentiator 110, and is an operation amount that varies in association with steering operation. The allocation ratio D1 is the proportion of allocation of the normal-time component FΔθ1 in obtaining the allocated component FΔθ3.

The multiplier 121 is a process of calculating an allocated normal-time component FΔθ1m by multiplying the allocation ratio D1 and the normal-time component FΔθ1.

The subtractor 122 is a process for calculating an allocation ratio D2 by subtracting the allocation ratio D1 from "1" stored in the storage unit 123. The storage unit 123 is a predetermined storage area of the memory (not shown). The allocation ratio D2 is the proportion of allocation of the under-restriction component FΔθ2 in obtaining the allocated component FΔθ3. The allocation ratio D2 is such a value that the sum of the allocation ratio D2 and the allocation ratio D1 is "1 (100%)." The allocation ratios D1, D2 are values that are set as appropriate according to specifications that restrict the operation of the turning motor 32, the product specifications of the steering device 2, etc.

The multiplier 124 is a process of calculating an allocated under-restriction component FΔθ2m by multiplying the allocation ratio D2 and the under-restriction component FΔθ2.

The adder 125 is a process of calculating the allocated component FΔθ3 by adding up the allocated normal-time component FΔθ1m and the allocated under-restriction component FΔθ2m.

The gradual change processing unit 126 is a process for gradually changing the value of the allocation ratio D1 relative to time. More specifically, the gradual change processing unit 126 includes a process of, when the value of the allocation ratio D1 changes, acquiring an allocation ratio deviation that is a deviation between before and after the change. Further, the gradual change processing unit 126 includes a process of calculating a final allocation ratio D1 by subtracting the allocation ratio deviation from the value after the change. In addition, the gradual change processing unit 126 includes a process of gradually reducing the allocation ratio deviation. Thus, the final allocation ratio D1 shifts gradually from the value before the change to the value after the change that is the original value.

Returning to the description of FIG. 4, the sign processing unit 104 is a process for calculating a sign Sin using the actual current Ib as an input. More specifically, the sign processing unit 104 includes a process of calculating "+1" when the actual current Ib is a positive value including the value "0." Further, the sign processing unit 104 includes a process of calculating "−1" when the actual current Ib is a negative value.

The multiplier 105 is a process for calculating a deviation-compensating base component FΔθ by multiplying the allocated component FΔθ3 and the sign Sin. The normal-time damping gain calculation unit 106 is a process for calculating a normal-time gain G1 using the positional deviation Δθ as an input. More specifically, the normal-time damping gain calculation unit 106 includes a process in which the CPU calculates the normal-time gain G1 through map calculation using, for example, a normal-time gain map M3. The normal time gain map M3 is map data that is stored in the memory of the reaction force control unit 50 in advance. The normal-time gain map M3 is data in which the absolute value of the positional deviation Δθ is an input variable and the normal-time gain G1 is an output variable.

As shown in FIG. 4, the normal-time gain map M3 that the normal-time damping gain calculation unit 106 uses has the following characteristics. For example, when the absolute value of the positional deviation Δθ is equal to or smaller than a third threshold value Δθ3, the value of the normal-time gain G1 is the value "0" that is a constant value. A range of the absolute value of the positional deviation Δθ equal to or smaller than the third threshold value Δθ3 is a dead band in which the value of the normal-time gain G1 does not change even when the positional deviation Δθ changes. When the absolute value of the positional deviation Δθ is larger than the third threshold value Δθ3, the value of the normal-time gain G1 is, for example, a value that increases monotonously according to the absolute value of the positional deviation Δθ. This is because when the absolute value of the positional deviation Δθ is larger, the allocated normal-time component FΔθ1m and the allocated under-restriction component FΔθ2m, i.e., the absolute value of the deviation-compensating base component FΔθ is considered to be larger.

The under-restriction damping gain calculation unit 107 is a process for calculating an under-restriction gain G2 using the positional deviation Δθ as an input. More specifically, the under-restriction damping gain calculation unit 107 includes a process in which the CPU calculates the under-restriction gain G2 through map calculation using, for example, an under-restriction gain map M4. The under-restriction gain map M4 is map data that is stored in the memory of the reaction force control unit 50 in advance. The under-restriction gain map M4 is data in which the absolute value of the positional deviation Δθ is an input variable and the under-restriction gain G2 is an output variable.

As shown in FIG. 4, the under-restriction gain map M4 that the under-restriction damping gain calculation unit 107 uses has the following characteristics. For example, when the absolute value of the positional deviation Δθ is equal to or smaller than a fourth threshold value Δθ4, the value of the under-restriction gain G2 is the value "0" that is a constant value. A range of the absolute value of the positional deviation Δθ equal to or smaller than the fourth threshold value Δθ4 is a dead band in which the value of the under-restriction gain G2 does not change even when the positional deviation Δθ changes. The fourth threshold value Δθ4 is a value smaller than the third threshold value Δθ3. Therefore, the range of the dead band in the under-restriction gain map M4 is narrower than that in the normal-time gain map M3. When the absolute value of the positional deviation Δθ is larger than the fourth threshold value Δθ4, the value of the under-restriction gain G2 is, for example, a value that increases monotonously according to the absolute value of the positional deviation Δθ. The gradient of this monotonous increase is a steeper gradient than the gradient of the monotonous increase of the normal-time gain G1. Accordingly, when the positional deviation Δθ is the same, the value of the under-restriction gain G2 is a larger value than the normal-time gain G1.

The gain allocation switching calculation unit 108 is a process for calculating an allocated gain G3 using the code signal Sm, the operation torque Th, the steering wheel angular speed ω, the positional deviation Δθ, the normal-time component FΔθ1, and the under-restriction component FΔθ2 as inputs. The gain allocation switching calculation unit 108 includes a process of calculating the allocated gain G3 by allocating the normal-time gain G1 and the under-restriction gain G2 at a predetermined proportion of allocation.

More specifically, as shown in FIG. 5, the gain allocation switching calculation unit 108 has constituent elements corresponding to the constituent elements of the component allocation switching calculation unit 103. An allocation ratio calculation unit 130 is a process for calculating an allocation ratio D3 in the same manner as the allocation ratio calculation unit 120. The allocation ratio D3 is the proportion of allocation of the normal-time gain G1 in obtaining the allocated gain G3.

A multiplier 131 is a process of calculating an allocated normal-time gain G1m in the same manner as the multiplier 121.

A subtractor 132 is a process for calculating an allocation ratio D4 using "1" stored in a storage unit 133 in the same manner as the subtractor 122. The allocation ratio D4 is the proportion of allocation of the under-restriction gain G2 in obtaining the allocated gain G3. The allocation ratio D4 is such a value that the sum of the allocation ratio D4 and the allocation ratio D3 is "1 (100%)." The allocation ratios D3, D4 are values that are set as appropriate according to specifications that restrict the operation of the turning motor 32, the product specifications of the steering device 2, etc.

A multiplier 134 is a process for calculating an allocated under-restriction gain G2m in the same manner as the multiplier 124.

An adder 135 is a process of calculating the allocated gain G3 in the same manner as the adder 125.

A gradual change processing unit 136 is a process for gradually changing the value of the allocation ratio D3 relative to time in the same manner as the gradual change processing unit 126.

Returning to the description of FIG. 4, the multiplier 109 is a process for calculating a damping component Fω by multiplying the allocated gain G3 and the steering wheel angular speed ω. The damping component Fω is a component in the same direction as the direction of steering operation that is the direction of the steering wheel angular speed ω. That is, the damping component Fω adjusts returning of steering operation due to the reaction force torque reflecting the deviation-compensating base component FΔθ. Examples include adjustment of vibration of the steering wheel 3 and a feeling of steering operation being pushed back that occur when the reaction force torque has changed.

The adder 111 is a process for calculating a combined component Ft by adding up the deviation-compensating base component FΔθ and the damping component Fω.

The guard processing unit 112 is a process for guarding the combined component Ft so as not to exceed a guard value Flim stored in the storage unit 113. The storage unit 113 is a predetermined storage area of the memory (not shown). The guard value Flim is, for example, a value within a range in which reflecting the deviation-compensating axial force component Fv in the reaction force torque does not affect steering operation. The guard processing unit 112 includes a process of comparing the guard value Flim and the combined component Ft. The guard processing unit 112 includes a process of, when the combined component Ft is smaller than the guard value Flim, calculating the deviation-compensating axial force component Fv that is equal to the combined component Ft. Further, the guard processing unit 112 includes a process of, when the combined component Ft is larger than the guard value Flim, calculating the deviation-compensating axial force component Fv that is equal to the guard value Flim.

Procedure of Process Executed by Component Allocation Switching Calculation Unit One example of the procedure of the process in which the reaction force control unit 50 sets the calculation state for calculating the deviation-compensating base component FΔθ through the component allocation switching calculation unit 103 will be described in accordance with the flowchart shown in FIG. 6.

Figure 6:
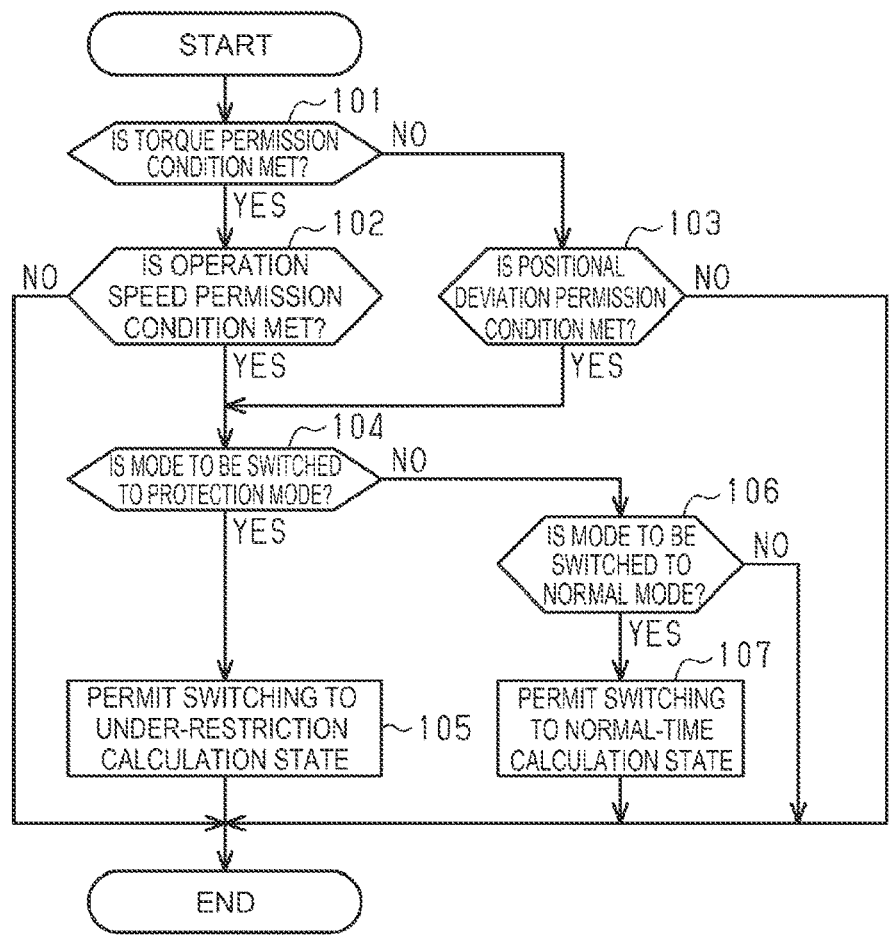
FIG. 6 is a flowchart showing a procedure of a process executed by the component allocation switching calculation unit of FIG. 5.

As shown in FIG. 6, in the component allocation switching calculation unit 103, the reaction force control unit 50 determines whether a torque permission condition is met (step 101). In step 101, the component allocation switching calculation unit 103 includes a process of determining whether the torque permission condition is met with reference to the operation torque Th. More specifically, the component allocation switching calculation unit 103 includes a process of determining whether the absolute value of the operation torque Th is equal to or larger than a torque threshold value Thth. In the component allocation switching calculation unit 103, when the absolute value of the operation torque Th is equal to or larger than the torque threshold value Thth, the reaction force control unit 50 determines that the torque permission condition is met. In the component allocation switching calculation unit 103, when the absolute value of the operation torque Th is smaller than the torque threshold value Thth, the reaction force control unit 50 determines that the torque permission condition is not met. The torque threshold value Thth is, for example, a value within a range in which it can be determined that the driver is holding the steering wheel 3 still. In this embodiment, the torque permission condition is one example of the permission condition.

Next, in the component allocation switching calculation unit 103, when it is determined that the torque permission condition is met (step 101: YES), the reaction force control unit 50 determines whether an operation speed permission condition is met (step 102). In step 102, the component allocation switching calculation unit 103 includes a process of determining whether the operation speed permission condition is met with reference to the steering wheel angular speed ω. More specifically, the component allocation switching calculation unit 103 includes a process of determining whether the absolute value of the steering wheel angular speed ω is equal to or larger than an operation speed threshold value ωth. In the component allocation switching calculation unit 103, when the absolute value of the steering wheel angular speed ω is equal to or larger than the operation speed threshold value ωth, the reaction force control unit 50 determines that the operation speed permission condition is met. In the component allocation switching calculation unit 103, when the absolute value of the steering wheel angular speed ω is smaller than the operation speed threshold value ωth, the reaction force control unit 50 determines that the operation speed permission condition is not met. The operation speed threshold value ωth is, for example, a value within a range in which it can be determined that the steering wheel 3 is rotating. The rotation in this case includes a case where the rotation is attributable to a self-aligning torque or the like, other than a case where the rotation is attributable to steering operation. In this embodiment, the operation speed permission condition is one example of the permission condition.

Next, in the component allocation switching calculation unit 103, when it is determined that the operation speed permission condition is met (step 102: YES), the reaction force control unit 50 determines that the calculation state can be switched, and executes the process of step 104 and the subsequent steps.

On the other hand, in the component allocation switching calculation unit 103, when it is determined that the operation speed permission condition is not met (step 102: NO), the reaction force control unit 50 determines that the calculation state cannot be switched, and ends the current process.

On the other hand, in the component allocation switching calculation unit 103, when it is determined that the torque permission condition is not met (step 101: NO), the reaction force control unit 50 determines whether a positional deviation permission condition is met (step 103). In step 103, the component allocation switching calculation unit 103 includes a process of determining whether the positional deviation permission condition is met with reference to the positional deviation Δθ. More specifically, the component allocation switching calculation unit 103 includes a process of determining whether the absolute value of the positional deviation Δθ is equal to or larger than a positional deviation threshold value Δθth. In the component allocation switching calculation unit 103, when the absolute value of the positional deviation Δθ is smaller than the positional deviation threshold value Δθth, the reaction force control unit 50 determines that the positional deviation permission condition is met. In the component allocation switching calculation unit 103, when the absolute value of the positional deviation Δθ is equal to or larger than the positional deviation threshold value Δθth, the reaction force control unit 50 determines that the positional deviation permission condition is not met. The positional deviation threshold value Δθth is, for example, a value within a range in which the steering wheel 3 does not rotate even when the deviation-compensating axial force component Fv obtained by reflecting one of the components FΔθ1, FΔθ2 calculated in the calculation state having been switched is reflected in the reaction force torque. This is based on an idea that if the positional deviation Δθ is small, even when the normal-time component FΔθ1 and the under-restriction component FΔθ2 are switched with each other, the difference between before and after the switching is small. In this embodiment, the positional deviation permission condition is one example of the permission condition.

Next, in the component allocation switching calculation unit 103, when it is determined that the positional deviation permission condition is not met (step 103: NO), the reaction force control unit 50 determines that the calculation state cannot be switched, and ends the current process.

On the other hand, in the component allocation switching calculation unit 103, when it is determined that the positional deviation permission condition is met (step 103: YES), the reaction force control unit 50 determines that the calculation state can be switched, and executes the process of step 104 and the subsequent steps.

Next, in the component allocation switching calculation unit 103, when it is determined that the calculation state can be switched (step 102: YES or step 103: YES), the reaction force control unit 50 determines whether the mode is to be switched to the protection mode in which the operation of the turning motor 32 is restricted (step 104). In step 104, the component allocation switching calculation unit 103 includes a process of determining whether the mode is to be switched to the protection mode with reference to the code signal Sm. More specifically, the component allocation switching calculation unit 103 includes a process of comparing the code signal Sm of an immediately preceding cycle and the code signal Sm of the current cycle as to their sameness. In the component allocation switching calculation unit 103, when the comparison between the code signals Sm as to their sameness finds that the code has changed from the code "0" to a code other than "0," the reaction force control unit 50 determines that the mode is to be switched to the protection mode. Otherwise, in the component allocation switching calculation unit 103, the reaction force control unit 50 determines that the mode is not to be switched to the protection mode.

Next, in the component allocation switching calculation unit 103, when it is determined that the mode is to be switched to the protection mode (step 104: YES), the reaction force control unit 50 permits switching to the under-restriction calculation state (step 105), and ends the current process. In step 105, the component allocation switching calculation unit 103 includes a process of, when the torque permission condition and the operation speed permission condition are met, determining that the permission condition is met and permitting switching to the under-restriction calculation state. Further, in step 105, the component allocation switching calculation unit 103 includes a process of, when the torque permission condition is not met but the positional deviation permission condition is met, determining that the permission condition is met and permitting switching to the under-restriction calculation state. In this case, the allocation ratio calculation unit 120 includes a process of calculating the allocation ratio D1 of "0 (0%)." This means that the subtractor 122 calculates the allocation ratio D2 of "1 (100%)." Thus, the allocation of the under-restriction component FΔθ2 in obtaining the allocated component FΔθ3 becomes maximum, i.e., "1 (100%)." The under-restriction calculation state is a calculation state for calculating the under-restriction deviation-compensating axial force component Fv by reducing the proportion of allocation of the normal-time component FΔθ1 to a minimum and increasing the proportion of allocation of the under-restriction component FΔθ2 to a maximum. The under-restriction calculation state is set in a context where the mode is switched to the protection mode in which the operation of the turning motor 32 is restricted (step 104: YES). In this embodiment, the under-restriction calculation state is one example of the second calculation state.

On the other hand, in the component allocation switching calculation unit 103, in the case where it can be determined that the mode can be switched to the protection mode and where the torque permission condition is met but the operation speed permission condition is not met, the reaction force control unit 50 determines that the permission condition is not met and determines that it is inappropriate to set the under-restriction calculation state. Further, in the component allocation switching calculation unit 103, in the case where it can be determined that the mode can be switched to the protection mode and where the torque permission condition and the positional deviation permission condition are not met, the reaction force control unit 50 determines that the permission condition is not met and determines that it is inappropriate to set the under-restriction calculation state. In these cases, in the component allocation switching calculation unit 103, the reaction force control unit 50 defers setting of the under-restriction calculation state even when it can be determined that the mode can be switched to the protection mode. In other words, in the component allocation switching calculation unit 103, the reaction force control unit 50 maintains the normal-time calculation state.

On the other hand, in the component allocation switching calculation unit 103, when it is determined that the mode is not to be switched to the protection mode (step 104: NO), the reaction force control unit 50 determines whether the mode is to be switched to the normal mode in which the operation of the turning motor 32 is not restricted (step 106). In step 106, the component allocation switching calculation unit 103 includes a process of determining whether the mode is to be switched to the normal mode with reference to the code signal Sm. As in step 104, the component allocation switching calculation unit 103 includes a process of comparing the code signal Sm of the immediately preceding cycle and the code signal Sm of the current cycle as to their sameness. In the component allocation switching calculation unit 103, when the comparison between the code signals Sm as to their sameness finds that the code has changed from a code other than "0" to the code "0," the reaction force control unit 50 determines that the mode is to be switched to the normal mode. Otherwise, in the component allocation switching calculation unit 103, the reaction force control unit 50 determines that the mode is not to be switched to the normal mode.

Next, in the component allocation switching calculation unit 103, when it is determined that the mode is to be switched to the normal mode (step 106: YES), the reaction force control unit 50 permits switching to the normal-time calculation state (step 107), and ends the current process. In step 107, the component allocation switching calculation unit 103 includes a process of, when the torque permission condition and the operation speed permission condition are met, determining that the permission condition is met and permitting switching to the normal-time calculation state. Further, in step 107, the component allocation switching calculation unit 103 includes a process of, when the torque permission condition is not met but the positional deviation permission condition is met, determining that the permission condition is met and permitting switching to the normal-time calculation state. In this case, the allocation ratio calculation unit 120 includes a process of calculating the allocation ratio D1 of "1 (100%)." This means that the subtractor 122 calculates the allocation ratio D2 of "0 (0%)." Thus, the allocation of the normal-time component $F\Delta\theta 1$ in obtaining the allocated component $F\Delta\theta 3$ becomes maximum, i.e., "1 (100%)." The normal-time calculation state is a calculation state for calculating the normal-time deviation-compensating axial force component Fv by increasing the proportion of allocation of the normal-time component $F\Delta\theta 1$ to a maximum and reducing the proportion of allocation of the under-restriction component $F\Delta\theta 2$ to a minimum. The normal-time calculation state is set in a context where the mode has been switched to the normal mode in which the operation of the turning motor 32 is not restricted (step 106: YES). In this embodiment, the under-restriction calculation state is one example of the first calculation state.

On the other hand, in the component allocation switching calculation unit 103, in the case where it can be determined that the mode is to be switched to the normal mode and where the torque permission condition is met but the operation speed permission condition is not met, the reaction force control unit 50 determines that the permission condition is not met and determines that it is inappropriate to set the normal-time calculation state. Further, in the component allocation switching calculation unit 103, in the case where it can be determined that the mode is to be switched to the normal mode and where the torque permission condition and the positional deviation permission condition are not met, the reaction force control unit 50 determines that the permission condition is not met and determines that it is inappropriate to set the normal-time calculation state. In these cases, in the component allocation switching calculation unit 103, the reaction force control unit 50 defers setting of the normal-time calculation state even when it can be determined that the mode is to be switched to the normal mode. In other words, in the component allocation switching calculation unit 103, the reaction force control unit 50 maintains the under-restriction calculation state.

On the other hand, in the component allocation switching calculation unit 103, when it is determined that the mode is not to be switched to the normal mode (step 106: NO), the reaction force control unit 50 ends the current process. In this case, in the component allocation switching calculation unit 103, the reaction force control unit 50 determines that the mode is to be switched to neither of the protection mode and the normal mode, i.e., that the current calculation state is maintained. Thus, in the component allocation switching calculation unit 103, the reaction force control unit 50 maintains the setting of the current calculation state. In other words, in the component allocation switching calculation unit 103, the reaction force control unit 50 maintains the under-restriction calculation state when the current calculation state is the under-restriction calculation state, and maintains the normal-time calculation state when the current calculation state is the normal-time calculation state.

The procedure of the process in which the reaction force control unit 50 sets the calculation state for calculating the damping component $F\omega$ through the gain allocation switching calculation unit 108 is the same as the procedure of the process in which the reaction force control unit 50 sets the calculation state for calculating the deviation-compensating base component $F\Delta\theta$ through the component allocation switching calculation unit 103.

More specifically, in the gain allocation switching calculation unit 108, the reaction force control unit 50 determines whether the torque permission condition is met, as a process corresponding to step 101. Further, in the gain allocation switching calculation unit 108, when it is determined that the torque permission condition is met, the reaction force control unit 50 determines whether the operation speed permission condition is met, as a process corresponding to step 102.

Further, in the gain allocation switching calculation unit 108, when it is determined that the operation speed permission condition is met, the reaction force control unit 50 determines whether the mode is to be switched to the protection mode in which the operation of the turning motor 32 is restricted, as a process corresponding to step 104.

Further, in the gain allocation switching calculation unit 108, when it is determined that the torque permission condition is not met, the reaction force control unit 50 determines whether the positional deviation permission condition is met, as a process corresponding to step 103.

Further, in the gain allocation switching calculation unit 108, when it is determined that the positional deviation permission condition is met, the reaction force control unit 50 determines whether the mode is to be switched to the protection mode in which the operation of the turning motor 32 is restricted, as a process corresponding to step 104.

Further, in the gain allocation switching calculation unit 108, when it is determined that the mode is to be switched to the protection mode, the reaction force control unit 50 permits switching to the under-restriction calculation state, as a process corresponding to step 105. In this case, in the gain allocation switching calculation unit 108, the reaction force control unit 50 determines that the permission condition is met when the torque permission condition and the operation speed permission condition are met, and permits switching to the under-restriction calculation state. Further, in the gain allocation switching calculation unit 108, the reaction force control unit 50 determines that the permission condition is met when the torque permission condition is not met but the positional deviation permission condition is met, and permits switching to the under-restriction calculation state. Thus, the allocation of the under-restriction gain G2 in obtaining the allocated gain G3 becomes maximum, i.e., "1 (100%)." The under-restriction calculation state is a calculation state for calculating the under-restriction damping component Fω by reducing the proportion of allocation of the normal-time gain G1 to a minimum and increasing the proportion of allocation of the under-restriction gain G2 to a maximum. On the other hand, in the gain allocation switching calculation unit 108, in the case where it can be determined that the mode is to be switched to the protection mode and where the torque permission condition is met but the operation speed permission condition is not met, the reaction force control unit 50 determines that the permission condition is not met and determines that it is inappropriate to set the under-restriction calculation state. Further, in the gain allocation switching calculation unit 108, in the case where it can be determined that the mode is to be switched to the protection mode and where the torque permission condition and the positional deviation permission condition are not met, the reaction force control unit 50 determines that the permission condition is not met and determines that it is inappropriate to set the under-restriction calculation state. In these cases, in the gain allocation switching calculation unit 108, the reaction force control unit 50 defers setting of the under-restriction calculation state even when it can be determined that the mode is to be switched to the protection mode.

In the gain allocation switching calculation unit 108, when it is determined that the mode is not to be switched to the protection mode, the reaction force control unit 50 determines whether the mode is to be switched to the normal mode in which the operation of the turning motor 32 is not restricted, as a process corresponding to step 106.

In the gain allocation switching calculation unit 108, when it is determined that the mode is to be switched to the normal mode, the reaction force control unit 50 permits switching to the normal-time calculation state, as a process corresponding to step 107. In this case, in the gain allocation switching calculation unit 108, the reaction force control unit 50 determines that the permission condition is met when the torque permission condition and the operation speed permission condition are met, and permits switching to the normal-time calculation state. Further, in the gain allocation switching calculation unit 108, the reaction force control unit 50 determines that the permission condition is met when the torque permission condition is not met but the positional deviation permission condition is met, and permits switching to the normal-time calculation state. Thus, the allocation of the normal-time gain G1 in obtaining the allocated gain G3 becomes maximum, i.e., "1 (100%)." The normal-time calculation state is a calculation state for calculating the normal-time damping component Fω by increasing the proportion of allocation of the normal-time gain G1 to a maximum and reducing the proportion of allocation of the under-restriction gain G2 to a minimum. On the other hand, in the gain allocation switching calculation unit 108, in the case where it can be determined that the mode is to be switched to the normal mode and where the torque permission condition is met but the operation speed permission condition is not met, the reaction force control unit 50 determines that the permission condition is not met and determines that it is inappropriate to set the normal-time calculation state. Further, in the gain allocation switching calculation unit 108, in the case where it can be determined that the mode is to be switched to the normal mode and where the torque permission condition and the positional deviation permission condition are not met, the reaction force control unit 50 determines that the permission condition is not met and determines that it is inappropriate to set the normal-time calculation state. In these cases, in the gain allocation switching calculation unit 108, the reaction force control unit 50 defers setting of the normal-time calculation state even when it can be determined that the mode is to be switched to the normal mode.

On the other hand, in the gain allocation switching calculation unit 108, when it is determined that the mode is not to be switched to the normal mode, the reaction force control unit 50 determines to maintain the current calculation state. In this embodiment, the calculation state for calculating the deviation-compensating base component FΔθ in the component allocation switching calculation unit 103 and the calculation state for calculating the damping component Fω in the gain allocation switching calculation unit 108 are linked to each other. That is, in the case of the normal-time calculation state, the reaction force control unit 50 calculates the normal-time deviation-compensating axial force component Fv by calculating the normal-time deviation-compensating base component FΔθ in the component allocation switching calculation unit 103 and calculating the normal-time damping component Fω in the gain allocation switching calculation unit 108. On the other hand, in the case of the under-restriction calculation state, the reaction force control unit 50 calculates the under-restriction deviation-compensating axial force component Fv by calculating the under-restriction deviation-compensating base component FΔθ in the component allocation switching calculation unit 103 and calculating the under-restriction damping component Fω in the gain allocation switching calculation unit 108.

Workings of Embodiment

In this embodiment, whether switching of the calculation state is permissible or impossible is determined based on the state of meeting of the torque permission condition, the positional deviation permission condition, and the operation speed permission condition. Whether the torque permission condition is met is defined by the operation torque Th. Whether the positional deviation permission condition is met is defined by the positional deviation Δθ. Whether the operation speed permission condition is met is defined by the steering wheel angular speed ω.

The operation torque Th allows determination as to whether the driver is holding the steering wheel 3 still. The positional deviation Δθ allows determination as to whether the steering wheel 3 rotates even when the deviation-compensating axial force component Fv calculated in the calculation state having been switched is reflected in the reaction force torque. The steering wheel angular speed ω allows determination as to whether the steering wheel 3 is rotating. Thus, the operation torque Th, the positional deviation Δθ, and the steering wheel angular speed ω allow inference of the state of the steering wheel 3 in the case where the reaction force torque reflecting the deviation-compensating axial force component Fv is applied to the steering wheel 3.

Figures 7, 8:
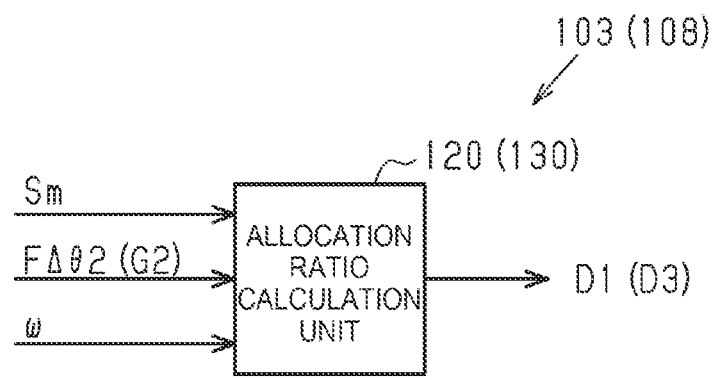
FIG. 7 is a table showing details of permission conditions according to the first embodiment.
FIG. 8 is a block diagram showing a process executed by a deviation-compensating axial force component calculation unit according to a second embodiment.

For example, FIG. 7 is a table showing a relationship between the state of meeting of the permission condition according to the operation torque Th, the steering wheel angular speed ω, and the positional deviation Δθ and the aspect of permitting or deferring switching of the calculation state. As shown in FIG. 7, when the operation torque Th is equal to or higher than the torque threshold value Thth, the state of the steering wheel 3 can be inferred to be a state in which the driver is holding the steering wheel 3 still. This allows inference that the steering wheel 3 is in a state of being less likely to rotate under the influence of the reaction force torque. In the case where the torque permission condition is met, if the steering wheel angular speed ω is equal to or higher than the operation speed threshold value ωth, switching between the normal-time and under-restriction calculation states is permitted regardless of whether the positional deviation permission condition is met. When the steering wheel angular speed ω is equal to or higher than the operation speed threshold value ωth, the steering wheel 3 can be inferred to be rotating.

As shown in FIG. 7, when the operation torque Th is lower than the torque threshold value Thth, the state of the steering wheel 3 can be inferred to be a state in which the driver is not holding the steering wheel 3 still. On the other hand, when the positional deviation Δθ is smaller than the positional deviation threshold value Δθth, the state of the steering wheel 3 can be inferred to be a state in which the steering wheel 3 will not rotate even when the deviation-compensating axial force component Fv calculated in the calculation state having been switched is reflected in the reaction force torque. In the case where the positional deviation permission condition is met, even when the torque permission condition is not met, switching of the calculation state is permitted regardless of the value of the steering wheel angular speed ω.

On the other hand, when the positional deviation Δθ is equal to or larger than the positional deviation threshold value Δθth, the state of the steering wheel 3 can be inferred to be a state in which the steering wheel 3 will rotate when the deviation-compensating axial force component Fv calculated in the calculation state having been switched is reflected in the reaction force torque. When neither the torque permission condition nor the positional deviation permission condition is met, switching of the calculation state is deferred regardless of the value of the steering wheel angular speed ω.

Thus, the permission condition for permitting switching of the calculation state can be specified to have a content that is met when the steering wheel 3 can be inferred to be in the state of being less likely to move under the influence of the reaction force torque reflecting the deviation-compensating axial force component Fv calculated in the calculation state having been switched.

Advantages of Embodiment (1-1) The reaction force control unit 50 can permit switching of the calculation state when the steering wheel 3 is inferred to be in the state of being less likely to move under the influence of the reaction force torque. Thus, discomfort caused to the driver can be mitigated.

(1-2) The result of the comparison in magnitude between the operation torque Th and the torque threshold value Thth allows appropriate inference of the magnitude of a force acting on the steering wheel 3 other than the reaction force torque. This is effective in increasing the inference accuracy of the reaction force control unit 50 as to whether the steering wheel 3 is in the state of being less likely to rotate under the influence of the reaction force torque.

(1-3) The result of the comparison in magnitude between the positional deviation Δθ and the positional deviation threshold value Δθth allows appropriate inference of the magnitude of the deviation-compensating axial force component Fv to be reflected in the reaction force torque applied to the steering wheel 3. This is effective in increasing the inference accuracy of the reaction force control unit 50 as to whether the steering wheel 3 is in the state of being less likely to rotate under the influence of the reaction force torque. Thus, if the positional deviation permission condition is met, switching of the calculation state can be permitted even when the torque permission condition is not met.

(1-4) The result of the comparison in magnitude between the steering wheel angular speed ω and the operation speed threshold value ωth allows appropriate inference as to whether the steering wheel 3 is rotating. That is, the permission condition for permitting switching of the calculation state can be specified to have a content that is met when the steering wheel 3 is inferred to be moving. This is effective in mitigating discomfort caused to the driver.

Second Embodiment

Next, a steering control device according to a second embodiment will be described. For the convenience of description, the same components as in the above-described first embodiment will be denoted by the same reference signs as in the first embodiment and description thereof will be omitted.

As shown in FIG. 8, the allocation ratio calculation unit 120 in the component allocation switching calculation unit 103 according to this embodiment is different from that of the above-described first embodiment in that the code signal Sm, the under-restriction component FΔθ2, and the steering wheel angular speed ω are used as inputs. The same applies to the allocation ratio calculation unit 130 in the gain allocation switching calculation unit 108. In this embodiment, the under-restriction component FΔθ2 is one example of the deviation compensation-related component that is obtained in association with calculation of the deviation-compensating axial force component Fv.

Procedure of Process Executed by Component Allocation Switching Calculation Unit One example of the procedure of the process in which the reaction force control unit 50 according to this embodiment sets the calculation state for calculating the deviation-compensating base component FΔθ through the component allocation switching calculation unit 103 will be described in accordance with the flowchart shown in FIG. 9.

Figure 9:
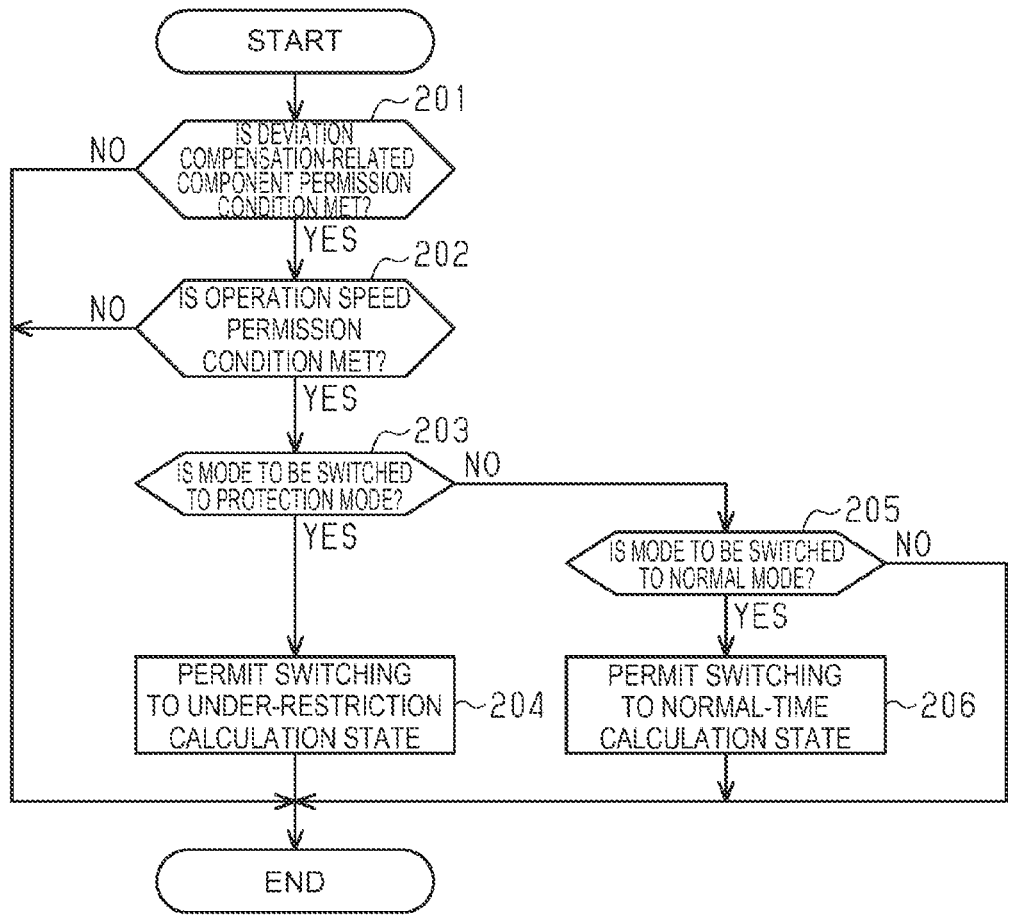
FIG. 9 is a flowchart showing a procedure of a process executed by a component allocation switching calculation unit of FIG. 8.

As shown in FIG. 9, in the component allocation switching calculation unit 103, the reaction force control unit 50 determines whether a deviation compensation-related component permission condition is met (step 201). In step 201, the component allocation switching calculation unit 103 includes a process of determining whether the deviation compensation-related component permission condition is met with reference to the under-restriction component FΔθ2. More specifically, the component allocation switching calculation unit 103 includes a process of determining whether the value (absolute value) of the under-restriction component FΔθ2 is equal to or larger than a deviation compensation-related component threshold value FΔθth. In the component allocation switching calculation unit 103, when the value of the under-restriction component FΔθ2 is equal to or larger than the deviation compensation-related component threshold value FΔθth, the reaction force control unit 50 determines that the deviation compensation-related component permission condition is not met. In the component allocation switching calculation unit 103, when the value of the under-restriction component FΔθ2 is smaller than the deviation compensation-related component threshold value FΔθth, the reaction force control unit 50 determines that the deviation compensation-related component permission condition is met. The deviation compensation-related component threshold value FΔθth is, for example, a value within a range in which the steering wheel 3 does not rotate even when the deviation-compensating axial force component Fv obtained by reflecting one of the components FΔθ1, FΔθ2 calculated in the calculation state having been switched is reflected in the reaction force torque. This is based on an idea that, if the under-restriction component FΔθ2 is small, even when the normal-time component FΔθ1 and the under-restriction component FΔθ2 are switched with each other, the difference between before and after the switching is small. In this embodiment, the deviation compensation-related component permission condition is one example of the permission condition.

Next, in the component allocation switching calculation unit 103, when it is determined that the deviation compensation-related component permission condition is met (step 201: YES), the reaction force control unit 50 determines whether the operation speed permission condition is met (step 202). In step 202, in the component allocation switching calculation unit 103, the reaction force control unit 50 determines whether the operation speed permission condition is met in the same manner as in step 102 of the above-described first embodiment.

Next, in the component allocation switching calculation unit 103, when it is determined that the operation speed permission condition is met (step 202: YES), the reaction force control unit 50 determines that the calculation state can be switched and executes the process of step 203 and the subsequent steps.

Next, in the component allocation switching calculation unit 103, when it is determined that the calculation state can be switched (step 202: YES), the reaction force control unit 50 determines whether the mode is to be switched to the protection mode in which the operation of the turning motor 32 is restricted (step 203). In step 203, in the component allocation switching calculation unit 103, the reaction force control unit 50 determines whether the mode is to be switched to the protection mode in the same manner as in step 104 of the above-described first embodiment.

Next, in the component allocation switching calculation unit 103, when it is determined that the mode is to be switched to the protection mode (step 203: YES), the reaction force control unit 50 permits switching to the under-restriction calculation state (step 204), and ends the current process. In step 204, the component allocation switching calculation unit 103 includes a process of determining that the permission condition is met when the deviation compensation-related component permission condition and the operation speed permission condition are met and permitting switching to the under-restriction calculation state. Thus, as in the above-described first embodiment, the allocation of the under-restriction component FΔθ2 in obtaining the allocated component FΔθ3 becomes maximum, i.e., "1 (100%)."

On the other hand, in the component allocation switching calculation unit 103, when it is determined that the operation speed permission condition is not met (step 202: NO), the reaction force control unit 50 determines that the calculation state cannot be switched, and ends the current process. In the component allocation switching calculation unit 103, when it is determined that the deviation compensation-related component permission condition is not met (step 201: NO), the reaction force control unit 50 determines that the calculation state cannot be switched, and ends the current process. Thus, as in the above-described first embodiment, in the component allocation switching calculation unit 103, the reaction force control unit 50 defers setting of the under-restriction calculation state even when it can be determined that the mode is to be switched to the protection mode.

On the other hand, in the component allocation switching calculation unit 103, when it is determined that the mode is not to be switched to the protection mode (step 203: NO), the reaction force control unit 50 determines whether the mode is to be switched to the normal mode in which the operation of the turning motor 32 is not restricted (step 205). In step 205, in the component allocation switching calculation unit 103, the reaction force control unit 50 determines whether the mode is to be switched to the normal mode in the same manner as in step 106 of the above-described first embodiment.

Next, in the component allocation switching calculation unit 103, when it is determined that the mode is to be switched to the normal mode (step 205: YES), the reaction force control unit 50 permits switching to the normal-time calculation state (step 206), and ends the current process. In step 206, the component allocation switching calculation unit 103 includes a process of determining that the permission condition is met when the deviation compensation-related component permission condition and the operation speed permission condition are met and permitting switching to the normal-time calculation state. Thus, as in the above-described first embodiment, the allocation of the normal-time component FΔθ1 in obtaining the allocated component FΔθ3 becomes maximum, i.e., "1 (100%)."

On the other hand, in the component allocation switching calculation unit 103, in the case where it can be determined that the mode is to be switched to the normal mode and where the deviation compensation-related component permission condition or the operation speed permission condition is not met, the reaction force control unit 50 determines that the permission condition is not met and determines that it is inappropriate to set the normal-time calculation state. Thus, as in the above-described first embodiment, in the component allocation switching calculation unit 103, the reaction force control unit 50 defers setting of the normal-time calculation state even when it can be determined that the mode is to be switched to the normal mode.

On the other hand, in the component allocation switching calculation unit 103, when it is determined that the mode is not to be switched to the normal mode (step 205: NO), the reaction force control unit 50 ends the current process. Thus, as in the above-described first embodiment, in the component allocation switching calculation unit 103, the reaction force control unit 50 maintains the setting of the current calculation state.

The reaction force control unit 50 sets the calculation state for calculating the damping component Fω through the gain allocation switching calculation unit 108 by the same procedure as that of the process in which the reaction force control unit 50 sets the calculation state for calculating the deviation-compensating base component FΔθ through the component allocation switching calculation unit 103.

More specifically, in the gain allocation switching calculation unit 108, the reaction force control unit 50 determines whether the deviation compensation-related component permission condition is met, as a process corresponding to step 201. In the gain allocation switching calculation unit 108, when it is determined that the deviation compensation-related component permission condition is met, the reaction force control unit 50 determines whether the operation speed permission condition is met, as a process corresponding to step 202.

In the gain allocation switching calculation unit 108, when it is determined that the operation speed permission condition is met, the reaction force control unit 50 determines whether the mode is to be switched to the protection mode in which the operation of the turning motor 32 is restricted, as a process corresponding to step 203.

In the gain allocation switching calculation unit 108, when it is determined that the mode is to be switched to the protection mode, the reaction force control unit 50 permits switching to the under-restriction calculation state, as a process corresponding to step 204. Thus, as in the above-described first embodiment, the allocation of the under-restriction gain G2 in obtaining the allocated gain G3 becomes maximum, i.e., "1 (100%)." On the other hand, in the gain allocation switching calculation unit 108, in the case where it can be determined that the mode is to be switched to the protection mode and where it is determined that the deviation compensation-related component permission condition or the operation speed permission condition is not met, the reaction force control unit 50 defers setting of the under-restriction calculation state.

In the gain allocation switching calculation unit 108, when it is determined that the mode is not to be switched to the protection mode, the reaction force control unit 50 determines whether the mode is to be switched to the normal mode in which the operation of the turning motor 32 is not restricted, as a process corresponding to step 205.

In the gain allocation switching calculation unit 108, when it is determined that the mode is to be switched to the normal mode, the reaction force control unit 50 permits switching to the normal-time calculation state, as a process corresponding to step 206. In this case, in the gain allocation switching calculation unit 108, the reaction force control unit 50 determines that the permission condition is met when the deviation compensation-related component permission condition and the operation speed permission condition are met, and permits switching to the normal-time calculation state. Thus, as in the above-described first embodiment, the allocation of the normal-time gain G1 in obtaining the allocated gain G3 becomes maximum, i.e., "1 (100%)." On the other hand, as in the above-described first embodiment, in the gain allocation switching calculation unit 108, when the deviation compensation-related component permission condition or the operation speed permission condition is not met, the reaction force control unit 50 determines that the permission condition is not met, and defers setting of the normal-time calculation state even when it can be determined that the mode is to be switched to the normal mode.

On the other hand, in the gain allocation switching calculation unit 108, when it is determined that the mode is not to be switched to the normal mode, the reaction force control unit 50 determines to maintain the current calculation state.

Workings of Embodiment

In this embodiment, whether switching of the calculation state is permissible or impossible is determined according to the state of meeting of the deviation compensation-related component permission condition and the operation speed permission condition. Whether the deviation compensation-related component permission condition is met is defined by the under-restriction component FΔθ2. Whether the operation speed permission condition is met is defined by the steering wheel angular speed ω.

The under-restriction component FΔθ2 allows determination as to whether the steering wheel 3 rotates even when the deviation-compensating axial force component Fv obtained by reflecting one of the components FΔθ1, FΔθ2 calculated in the calculation state having been switched is reflected in the reaction force torque. The steering wheel angular speed ω allows determination as to whether the steering wheel 3 is rotating. Thus, the under-restriction component FΔθ2 and the steering wheel angular speed ω allow inference of the state of the steering wheel 3 in the case where the reaction force torque reflecting the deviation-compensating axial force component Fv is applied to the steering wheel 3.

Thus, the permission condition for permitting switching of the calculation state can be specified to have a content that is met when the steering wheel 3 can be inferred to be in the state of being less likely to move under the influence of the reaction force torque reflecting the deviation-compensating axial force component Fv calculated in the calculation state having been switched.

Advantages of Embodiment

According to the second embodiment having been described above, advantages equivalent to (1-1) and (1-4) of the above-described first embodiment can be achieved. In addition, according to the second embodiment, the following advantage can be further achieved.

(2-1) The result of the comparison in magnitude between the under-restriction component FΔθ2 and the deviation compensation-related component threshold value FΔθth allows appropriate inference of the magnitude of the reaction force torque to be applied to the steering wheel 3. This is effective in increasing the inference accuracy of the reaction force control unit 50 as to whether the steering wheel 3 is in the state of being less likely to rotate under the influence of the reaction force torque.

Other Embodiments

Each of the above-described embodiments may be changed as follows. The following other embodiments can be combined with one another within such a range that no technical inconsistency arises.

In the above-described first embodiment, the process of step 102 shown in FIG. 6, i.e., the process of determining whether the operation speed permission condition is met may be changed to a process before step 101, i.e., before determining whether the torque permission condition is met. The other embodiment described here is applicable to the process of the above-described second embodiment as well. That is, the process of step 202 shown in FIG. 9 may be changed to a process before the process of step 201.

In the above-described first embodiment, the operation speed permission condition may be omitted. That is, the process of step 102 shown in FIG. 6 may be omitted. The other embodiment described here is applicable to the process of the above-described second embodiment as well. That is, the process of step 202 shown in FIG. 9 may be omitted.

In the above-described first embodiment, the positional deviation permission condition may be omitted. That is, the process of step 103 shown in FIG. 6 may be omitted. In this case, when the result of step 101 shown in FIG. 6 is NO, in the component allocation switching calculation unit 103, the reaction force control unit 50 defers setting of the under-restriction calculation state even when it can be determined that the mode is to be switched to the protection mode.

In the above-described first embodiment, the torque permission condition may be defined by the rotation angle θa, i.e., the steering wheel angle θs. For example, the steering wheel angle θs can be used for calculating a component corresponding to the operation torque Th.

In the above-described first embodiment, the operation speed permission condition may be defined by an angular speed obtained by differentiating the rotation angle θa, or by a detection result of an angular speed sensor provided on the steering shaft 11. The other embodiment described here is applicable to the above-described second embodiment as well.

In the above-described first embodiment, the gradual change processing unit 126 may be omitted from the component allocation switching calculation unit 103. The same applies to the gain allocation switching calculation unit 108. The other embodiment described here is applicable to the above-described second embodiment as well.

In the above-described first embodiment, for example, a filtering process using a low-pass filter may be adopted for the gradual change processing unit 126, as long as a rapid change in the allocation ratio D1 can be thereby turned into a gradual change. The same applies to the gradual change processing unit 136. The other embodiment described here is applicable to the above-described second embodiment as well.

In the above-described second embodiment, the deviation compensation-related component permission condition may be defined by the allocated component FΔθ3, the deviation-compensating base component FΔθ, the combined component Ft, or the deviation-compensating axial force component Fv. That is, at a minimum, the deviation compensation-related component permission condition should be defined by a component that is obtained in association with calculation of the deviation-compensating axial force component Fv.

In each of the above-described embodiments, the dead bands in which the values of the components FΔθ1, FΔθ2 do not change even when the positional deviation Δθ changes may be omitted from the component maps M1, M2. The first threshold value Δθ1 and the second threshold value Δθ2 may be set to the same value such that the ranges of the dead bands in the component maps M1, M2 match. The gradients of the monotonous increase of the normal-time component FΔθ1 and the under-restriction component FΔθ2 in the component maps M1, M2 may be changed as appropriate, as long as the gradient of the latter is steeper than that of the former.

Figure 10A:
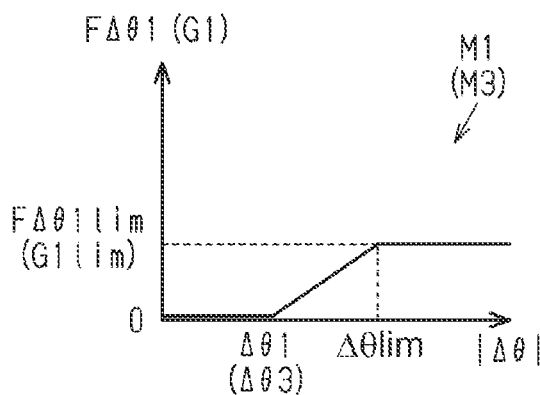
FIG. 10A is a graph showing a component map according to another embodiment.
Figure 10B:
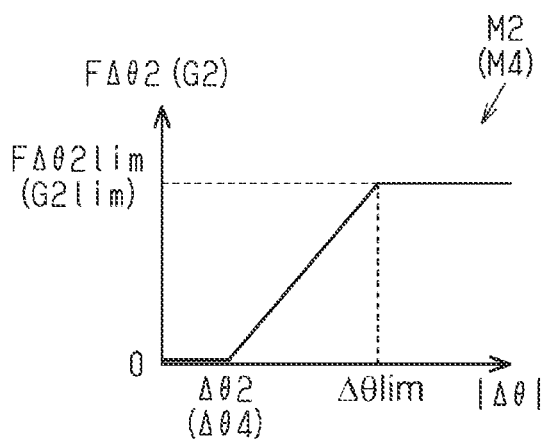
FIG. 10B is a graph showing a component map according to another embodiment.

In each of the above-described embodiments, as shown in FIG. 10A and FIG. 10B, the component maps M1, M2 may have characteristics in which upper limit values FΔθ1lim, FΔθ2lim are specified for the values of the components FΔθ1, FΔθ2, respectively. That is, for example, when the absolute value of the positional deviation Δθ is equal to or larger than an upper limit threshold value Δθlim that is a value larger than the first threshold value Δθ1, the value of the normal-time component FΔθ1 is the first upper limit value FΔθ1lim. For example, when the absolute value of the positional deviation Δθ is equal to or larger than the upper limit threshold value Δθlim that is a value larger than the second threshold value Δθ2, the value of the under-restriction component FΔθ2 is the second upper limit value FΔθ2lim. The upper limit threshold value Δθlim may be different between the component maps M1, M2. For example, the upper limit values FΔθ1lim, FΔθ2lim may be any values that are within a range in which reflecting the deviation-compensating axial force component Fv in the reaction force torque does not affect steering operation, and that take into account the guard value Flim stored in the storage unit 113. In this case, the guard processing unit 112 and the storage unit 113 can be omitted. The characteristics of the normal-time component map M1 may be the same characteristics as in each of the above-described embodiments.

Figure 11A:
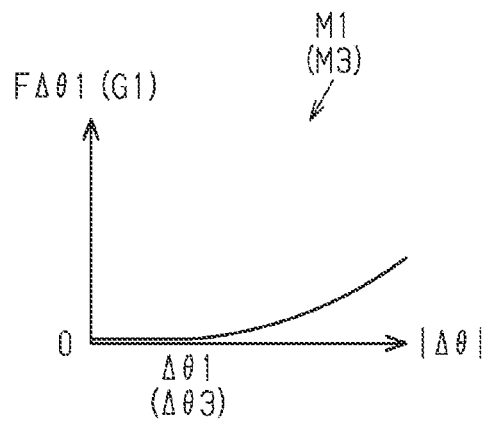
FIG. 11A is a graph showing a component map according to another embodiment.
Figure 11B:
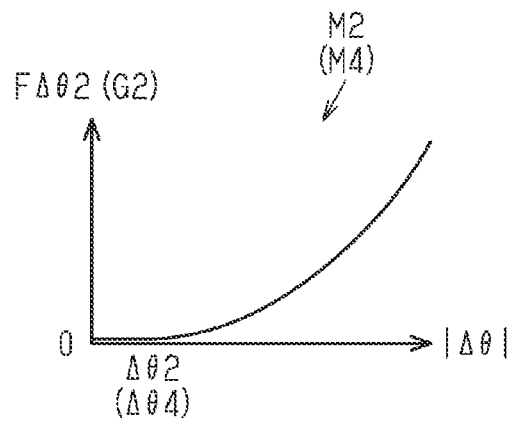
FIG. 11B is a graph showing a component map according to another embodiment.

In each of the above-described embodiments, as shown in FIG. 11A and FIG. 11B, the component maps M1, M2 may have characteristics in which, when the absolute value of the positional deviation Δθ is larger than the threshold values Δθ1, Δθ2, the components FΔθ1, FΔθ2 increase smoothly, for example, according to the absolute value of the positional deviation Δθ. The change of this smooth increase may be a non-linear change or may be a combination of a plurality of linear changes with different gradients. The other embodiment described here can also be realized in combination with the above-described other embodiment in which upper limit values are specified for the values of the components FΔθ1, FΔθ2.

Figure 12A:
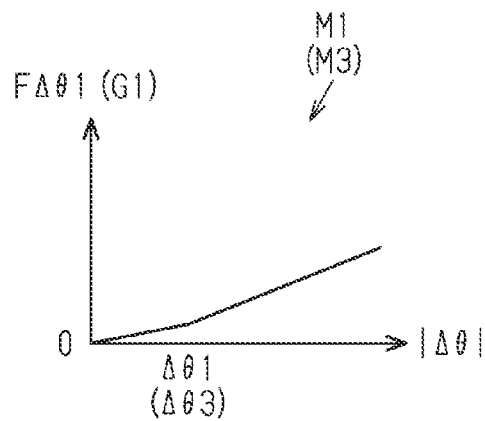
FIG. 12A is a graph showing a component map according to another embodiment.
Figure 12B:
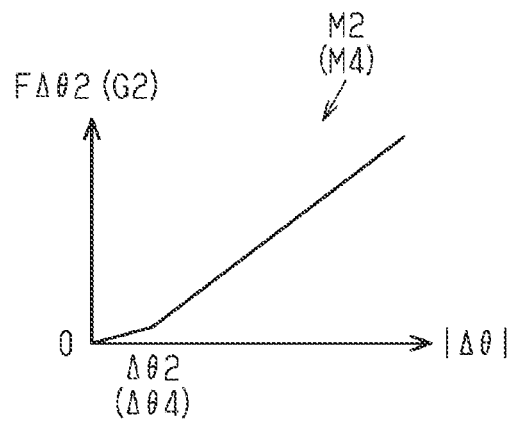
FIG. 12B is a graph showing a component map according to another embodiment.

In each of the above-described embodiments, as shown in FIG. 12A and FIG. 12B, the component maps M1, M2 may have characteristics in which, when the absolute value of the positional deviation Δθ is equal to or smaller than the threshold values Δθ1, Δθ2, the components FΔθ1, FΔθ2 are values that increase slightly, for example, according to the absolute value of the positional deviation Δθ. The change of this slight increase may be a linear change or a non-linear change. The other embodiment described here can also be realized in combination with the above-described other embodiments in which upper limit values are specified for the values of the components FΔθ1, FΔθ2, and in which, when the absolute value of the positional deviation Δθ is larger than the threshold values Δθ1, Δθ2, the values of the components FΔθ1, FΔθ2 increase smoothly.

In each of the above-described embodiments, in the code signal generation unit 66, the turning control unit 60 may detect a mechanical abnormality of the turning actuator 31 with reference to detection results of various sensors. For example, in the code signal generation unit 66, when it can be determined that there is a mechanical abnormality in the turning actuator 31, the turning control unit 60 should generate the code signal Sm that indicates the protection mode.

In each of the above-described embodiments, the under-restriction component calculation unit 102 may include a plurality of under-restriction component calculation units 102 corresponding to the codes representing factors for switching to the protection mode. In this case, the under-restriction gain map M4 should include a plurality of maps corresponding to the codes.

In each of the above-described embodiments, the axial force component selection unit 74 may be omitted. In this case, for example, the axial force component F can be obtained by adding up the allocated axial force component Fd, the end-restriction axial force component Fe, and the deviation-compensating axial force component Fv.

In each of the above-described embodiments, the axial force component calculation unit 56 may additionally include a process of calculating an axial force component other than the axial force components calculated by the calculation units 71, 72, 73. For example, the axial force component selection unit 74 should include a process of selecting one of the end-restriction axial force component Fe, the deviation-compensating axial force component Fv, and the other axial force component that has the largest absolute value.

In each of the above-described embodiments, the pinion angle feedback control unit 63 may execute PID control using a proportional term, an integral term, and a differential term as the feedback control of the pinion angle θp.

In each of the above-described embodiments, the end-restriction axial force component calculation unit 72 may be omitted. This means that the axial force component selection unit 74 may be omitted.

In each of the above-described embodiments, the damping component Fω may take the vehicle speed V into account. In this case, the vehicle speed V may be taken into account in calculating the gains G1, G2, or may be taken into account separately from the allocated gain G3 or the gains G1, G2.

In each of the above-described embodiments, the multiplier 109 may use an angular speed of the pinion angle θp, an angular speed of the target pinion angle θp*, or an angular speed of the turning-converted angle θp_s instead of the steering wheel angular speed ω.

In each of the above-described embodiments, the damping component Fω may be omitted. In this case, the components involved in calculating the damping component Fω can be omitted.

In each of the above-described embodiments, the dead bands in which the values of the gains G1, G2 do not change even when the positional deviation Δθ changes may be omitted from the gain maps M3, M4. The third threshold value Δθ3 and the fourth threshold value Δθ4 may be set to the same value such that the ranges of the dead bands in the gain maps M3, M4 match. The gradients of the monotonous increase of the normal-time gain G1 and the under-restriction gain G2 in the gain maps M3, M4 may be changed as appropriate, as long as the gradient of the latter is steeper than that of the former.

In each of the above-described embodiments, as in FIG. 10A and FIG. 10B, the gain maps M3, M4 may have characteristics in which upper limit values G1lim, G2lim are specified for the values of the gains G1, G2, respectively. That is, for example, when the absolute value of the positional deviation Δθ is equal to or larger than the upper limit threshold value Δθlim that is a value larger than the third threshold value Δθ3, the value of the normal-time gain G1 is the first upper limit value G1lim. For example, when the absolute value of the positional deviation Δθ is equal to or larger than the upper limit threshold value Δθlim that is a value larger than the fourth threshold value Δθ4, the value of the under-restriction gain G2 is the second upper limit value G2lim. The upper limit threshold value Δθlim may be different between the gain maps M3, M4. The characteristics of the normal-time gain map M3 may be the same characteristics as in each of the above-described embodiments.

In each of the above-described embodiments, as in FIG. 11A and FIG. 11B, the gain maps M3, M4 may have characteristics in which, when the absolute value of the positional deviation Δθ is larger than the threshold values Δθ3, Δθ4, the gains G1, G2 increase smoothly, for example, according to the absolute value of the positional deviation Δθ. The change of this smooth increase may be a non-linear change or may be a combination of a plurality of linear changes with different gradients. The other embodiment described here can also be realized in combination with the above-described other embodiment in which upper limit values are specified for the values of the gains G1, G2.

In each of the above-described embodiments, as in FIG. 12A and FIG. 12B, the gain maps M3, M4 may have characteristics in which, when the absolute value of the positional deviation Δθ is equal to or smaller than the threshold values Δθ3, Δθ4, the gains G1, G2 are values that increase slightly, for example, according to the absolute value of the positional deviation Δθ. The change of this slight increase may be a linear change or a non-linear change. The other embodiment described here can also be realized in combination with the above-described other embodiments in which upper limit values are specified for the values of the gains G1, G2, and in which, when the absolute value of the positional deviation Δθ is larger than the threshold values Δθ3, Δθ4, the values of the gains G1, G2 increase smoothly.

Figure 13A:
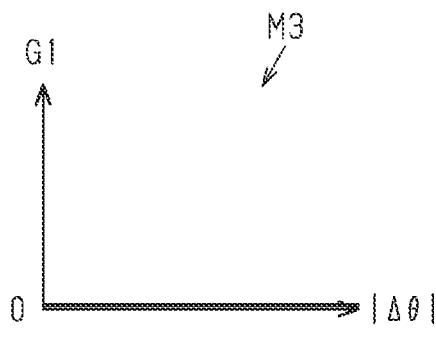
FIG. 13A is a graph showing a gain map according to another embodiment.
Figure 13B:
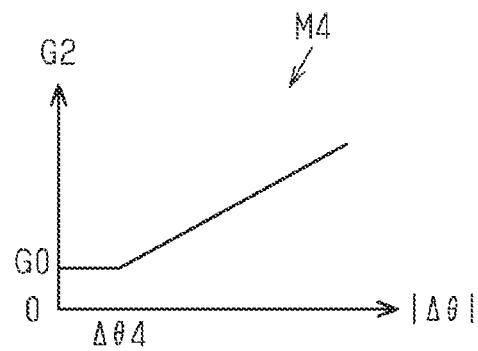
FIG. 13B is a graph showing a gain map according to another embodiment.

In each of the above-described embodiments, as shown in FIG. 13A and FIG. 13B, the characteristics of the gain maps M3, M4 may be characteristics different from each other in tendency. For example, the normal-time gain map M3 has characteristics in which the normal-time gain G1 is the value "0" that is a constant value regardless of the value of the positional deviation Δθ. On the other hand, the under-restriction gain map M4 has characteristics in which the under-restriction gain G2 is a value larger than the value "0" regardless of the value of the positional deviation Δθ. In this case, when the absolute value of the positional deviation Δθ is equal to or smaller than the fourth threshold value Δθ4, the value of the under-restriction gain G2 is an initial value G0 that is larger than the value "0." When the absolute value of the positional deviation Δθ is larger than the fourth threshold value Δθ4, the value of the under-restriction gain G2 is a value that increases monotonously, for example, according to the absolute value of the positional deviation Δθ. The other embodiment described here can appropriately achieve mitigation of vibration of the steering wheel 3 and the feeling of steering operation being pushed back that occur when the reaction force torque has changed in association with switching to the under-restriction calculation state. In this case, the other embodiment described here can also be realized in combination with the above-described other embodiments in which an upper limit value is specified for the value of the under-restriction gain G2, and in which, when the absolute value of the positional deviation Δθ is larger than the fourth threshold value Δθ4, the value of the under-restriction gain G2 increases smoothly, and in which, when the absolute value of the positional deviation Δθ is equal to or smaller than the fourth threshold value Δθ4, the value of the under-restriction gain G2 increases slightly.

Figure 14:
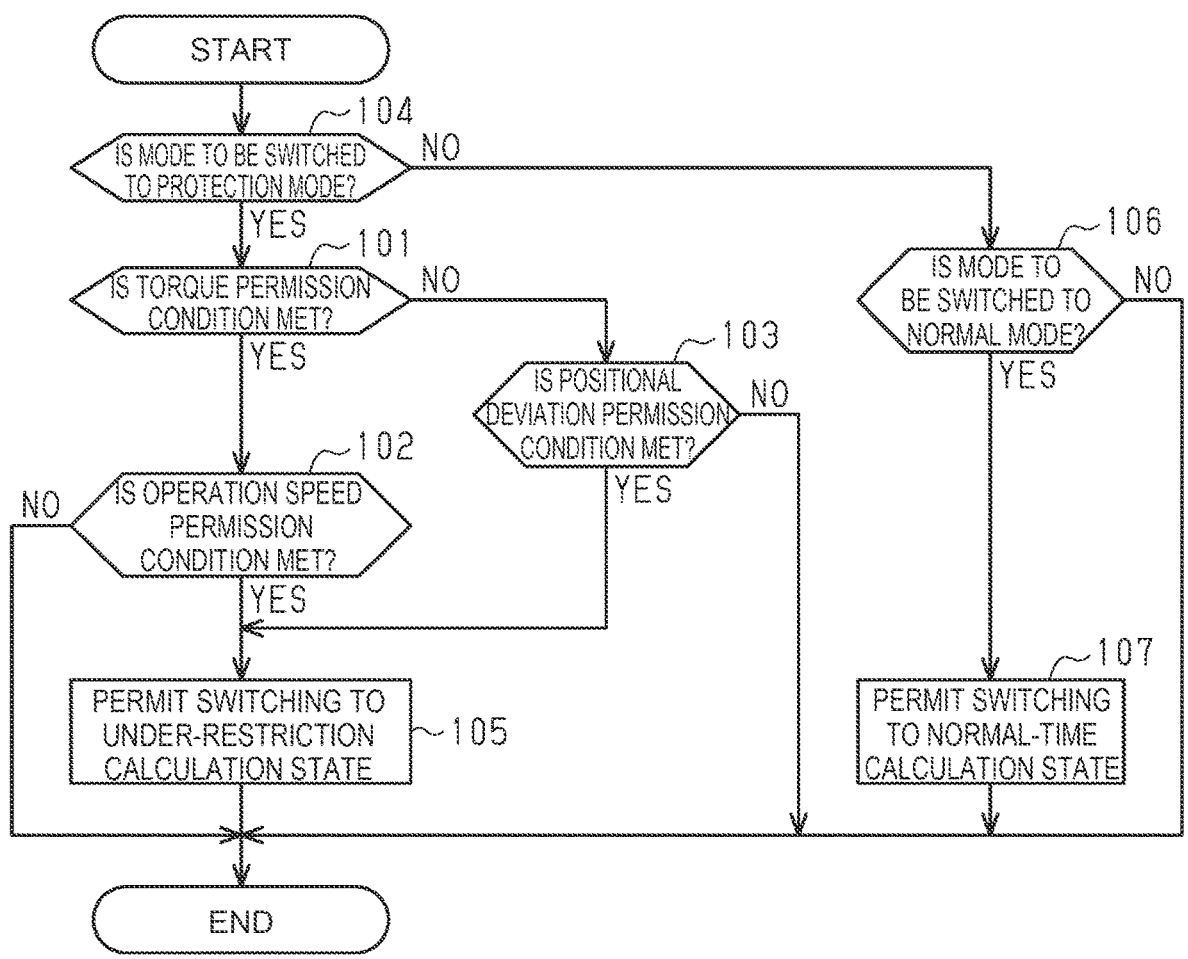
FIG. 14 is a flowchart showing a procedure of a process executed by a component allocation switching calculation unit according to another embodiment.

In each of the above-described embodiments, a configuration may be adopted in which the determination of whether the permission condition is met is performed when the calculation state is switched to either the normal-time calculation state or the under-restriction calculation state. In the case where the other embodiment described here is applied to the above-described first embodiment, for example, as shown in FIG. 14, the determination of whether the permission condition is met can be performed only when the calculation state is switched to the under-restriction calculation state. More specifically, the processes of steps 101 to 103 shown in FIG. 6, i.e., the processes of determining whether the permission conditions are met should be changed to processes between the process of step 104 and the process of step 105. On the other hand, in the case where the determination of whether the permission condition is met is performed only when the calculation state is switched to the normal-time calculation state, the processes of steps 101 to 103 shown in FIG. 6, i.e., the processes of determining whether the permission conditions are met should be changed to processes between the process of step 106 and the process of step 107. Further, in the case where the other embodiment described here is applied to the above-described second embodiment, it can be realized by changing the processes of steps 201 to 203 shown in FIG. 9, i.e., the processes of determining whether the permission conditions are met to processes between the process of step 203 and the process of step 204. In the above-described second embodiment, the other embodiment described here can be realized by changing the processes of steps 201 to 203 shown in FIG. 9, i.e., the processes of determining whether the permission conditions are met to processes between the process of step 205 and the process of step 206.

In each of the above-described embodiments, the sum of the allocation ratio D1 and the allocation ratio D2 may exceed "1 (100%)." The same applies to the allocation ratio D3 and the allocation ratio D4.

In each of the above-described embodiments, the positional deviation $\Delta\theta$ may be represented as an index value of the turning angle of the turning wheels 5, as long as this index value can quantitatively indicate the degree of discrepancy in the relationship between the steering wheel angle $\theta s$ of the operation unit 4 and the pinion angle $\theta p$ of the turning wheels 5.

In each of the above-described embodiments, the deviation-compensating axial force component calculation unit 73 may be a process of the turning control unit 60. The axial force component calculation unit 56 may be a process of the turning control unit 60 along with the process of the deviation-compensating axial force component calculation unit 73. In this case, a configuration should be adopted in which the deviation-compensating axial force component Fv or the axial force component F calculated by the turning control unit 60 is input into the reaction force torque calculation unit 52 of the reaction force control unit 50.

In each of the above-described embodiments, the code signal generation unit 66 may be a process of the reaction force control unit 50. In this case, a configuration should be adopted in which detection results of the temperature sensor, the voltage sensor, etc. are input into the code signal generation unit provided in the reaction force control unit 50.

In each of the above-described embodiments, an order of priority may be set for the codes. For example, the codes indicating the heating state of the turning motor 32 may be reflected with priority over the codes indicating the voltage state of the direct-current power source.

In each of the above-described embodiments, a configuration may be adopted in which the operation of the turning motor 32 is not restricted in the slight overheating state and the slight low-voltage state. For example, the type of code that leads to setting of the protection mode can be changed as appropriate.

In each of the above-described embodiments, an angular axial force calculation unit 81 or a current axial force calculation unit 82 may be omitted from the allocated axial force component calculation unit 71.

In each of the above-described embodiments, when calculating the assistance component Tb*, for example, the assistance component calculation unit 55 need not use the vehicle speed V or may use the steering wheel angle $\theta s$ instead of the operation torque Th.

In each of the above-described embodiments, the control units 50, 60 may constitute a single control unit that integrates the processes of these control units.

In each of the above-described embodiments, the pinion angle calculation unit 61 may be a process of converting a detection value of the amount of movement of the rack shaft 22 into the pinion angle $\theta p$. In this case, unlike in each of the above-described embodiments, the operation amount relating to the pinion angle $\theta p$ etc. is converted by the detection value of the amount of movement of the rack shaft 22.

In each of the above-described embodiments, the steering wheel angle $\theta s$ may be a detection value of a steering angle sensor that directly detects the rotation angle of the steering shaft 11. The steering angle sensor may be provided, for example, on the steering shaft 11, between the steering wheel 3 and the torque sensor 41.

In each of the above-described embodiments, the operation member that the driver operates to steer the vehicle is not limited to the steering wheel 3 but may also be, for example, a joystick.

In each of the above-described embodiments, the reaction force motor 13 that is mechanically coupled to the steering wheel 3 is not limited to a three-phase brushless motor but may also be, for example, a direct-current motor with a brush.

In each of the above-described embodiments, the turning unit 6 transmits rotation of the turning motor 32 to the conversion mechanism 34 through the transmission mechanism 33. Without being limited thereto, for example, the turning unit 6 may be configured to transmit rotation of the turning motor 32 to the conversion mechanism 34 through a gear mechanism. Or the turning unit 6 may be configured such that the turning motor 32 directly rotates the conversion mechanism 34. Further, the turning unit 6 may have a configuration including a second rack-and-pinion mechanism, and the turning unit 6 may be configured to convert rotation of the turning motor 32 into reciprocating motion of the rack shaft 22 by this second rack-and-pinion mechanism.

In each of the above-described embodiments, the turning unit 6 is not limited to the configuration in which the right turning wheel 5 and the left turning wheel 5 turn in conjunction with each other. In other words, the right turning wheel 5 and the left turning wheel 5 may be independently controllable.

In each of the above-described embodiments, the steering device 2 has a link-less structure in which the operation unit 4 and the turning unit 6 are always mechanically cut off. Without being limited thereto, the steering device 2 may have a structure in which the operation unit 4 and the turning unit 6 can be mechanically cut off by, for example, a clutch.

What is claimed is:

1. A steering control device configured to control a steering device of a vehicle, the steering device having a structure in which a power transmission path between an operation unit and a turning unit is cut off, the operation unit including an operation member and a reaction force motor configured to generate a reaction force torque that resists a driver's operation of the operation member, the turning unit being configured to turn a turning wheel and including a turning motor configured to generate a turning torque for turning the turning wheel, the steering control device comprising a processor configured to execute a reaction force control process for controlling operation of the reaction force motor so as to apply the reaction force torque to the operation member, wherein the reaction force control process includes a
reaction force torque calculation process of calculating a reaction force torque operation amount indicating the reaction force torque to be generated by the reaction force motor, the reaction force torque calculation process including a deviation compensation calculation process of calculating a deviation-compensating component, the deviation-compensating component being a component that is reflected in the reaction force torque operation amount so as to compensate for discrepancy in a relationship between an operation position of the operation member and a turning position of the turning wheel, the deviation compensation calculation process including:
a process of calculating a positional deviation that quantitatively indicates a degree of discrepancy in the relationship between the operation position and the turning position;
a process of calculating the deviation-compensating component based on the positional deviation; and
a process of switching among a plurality of calculation states for calculating the deviation-compensating component, the plurality of calculation states including a first calculation state that is set in a context where operation of the turning motor is not restricted and a second calculation state that is set in a context where the operation of the turning motor is restricted, the second calculation state being a calculation state in which the deviation-compensating component of a larger absolute value is calculated than in the first calculation state,
the process of switching among the calculation states being a process of permitting switching among the calculation states on a condition that a permission condition is met, the permission condition being met based on an operation amount that varies in association with the driver's operation of the operation member.

2. The steering control device according to claim 1, wherein:
the operation amount includes an operation torque that is input into the operation member;
the permission condition includes a condition based on a result of a comparison in magnitude between the operation torque and a torque threshold value; and
the process of switching among the calculation states is a process of permitting switching among the calculation states on a condition that a torque permission condition is met, the torque permission condition being met when an absolute value of the operation torque is equal to or larger than the torque threshold value.

3. The steering control device according to claim 2, wherein:
the operation amount includes the positional deviation;
the permission condition includes a condition based on a result of a comparison in magnitude between the positional deviation and a positional deviation threshold value; and
the process of switching among the calculation states is a process of permitting switching among the calculation states on a condition that at least either a positional deviation permission condition or the torque permission condition is met, the positional deviation permission condition being met when an absolute value of the positional deviation is smaller than the positional deviation threshold value.

4. The steering control device according to claim 1, wherein:
the operation amount includes a deviation compensation-related component that is obtained in association with a calculation of the deviation-compensating component;
the permission condition includes a condition based on a result of a comparison in magnitude between the deviation compensation-related component and a deviation compensation-related component threshold value; and
the process of switching among the calculation states is a process of permitting switching among the calculation states on a condition that a deviation compensation-related component permission condition is met, the deviation compensation-related component permission condition being met when an absolute value of the deviation compensation-related component is smaller than the deviation compensation-related component threshold value.

5. The steering control device according to claim 2, wherein:
the operation amount includes an operation speed of the operation member;
the permission condition includes a condition based on a result of a comparison in magnitude between the operation speed and an operation speed threshold value; and
the process of switching among the calculation states is a process of permitting switching among the calculation states on a condition at least that an operation speed permission condition is met, the operation speed permission condition being met when an absolute value of the operation speed is smaller than the operation speed threshold value.

6. A steering control method of controlling a steering device of a vehicle having a structure in which a power transmission path between an operation unit and a turning unit is cut off, the operation unit including an operation member and a reaction force motor configured to generate a reaction force torque that resists a driver's operation of the operation member, the turning unit including a turning motor configured to generate a turning torque for turning a turning wheel, the steering control method comprising executing, by a processor, a reaction force control process for controlling operation of the reaction force motor so as to apply the reaction force torque to the operation member,
wherein the reaction force control process includes a reaction force torque calculation process of calculating a reaction force torque operation amount indicating the reaction force torque to be generated by the reaction force motor,
the reaction force torque calculation process including a deviation compensation calculation process of calculating a deviation-compensating component, the deviation-compensating component being a component that is reflected in the reaction force torque operation amount so as to compensate for discrepancy in a relationship between an operation position of the operation member and a turning position of the turning wheel,
the deviation compensation calculation process including:
a process of calculating a positional deviation that quantitatively indicates a degree of discrepancy in the relationship between the operation position and the turning position;
a process of calculating the deviation-compensating component based on the positional deviation; and a process of switching among a plurality of calculation states for calculating the deviation-compensating component, the plurality of calculation states including a first calculation state that is set in a context where operation of the turning motor is not restricted and a second calculation state that is set in a context where the operation of the turning motor is restricted, the second calculation state being a calculation state in which the deviation-compensating component of a larger absolute value is calculated than in the first calculation state, the process of switching among the calculation states being a process of permitting switching among the calculation states on a condition that a permission condition is met, the permission condition being met based on an operation amount that varies in association with the driver's operation of the operation member.

* * * * *